US012624956B2

(12) United States Patent
Yang et al.

(10) Patent No.: US 12,624,956 B2
(45) Date of Patent: May 12, 2026

(54) CHARGING STATION RECOMMENDATION DEVICE AND METHOD THEREFOR

(71) Applicants: Hyundai Motor Company, Seoul (KR); Kia Corporation, Seoul (KR)

(72) Inventors: Won Seok Yang, Gunpo-si (KR); Joon Sung Kwon, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 378 days.

(21) Appl. No.: 17/961,486

(22) Filed: Oct. 6, 2022

(65) Prior Publication Data

US 2023/0266138 A1    Aug. 24, 2023

(30) Foreign Application Priority Data

Feb. 18, 2022    (KR) ........................ 10-2022-0021688

(51) Int. Cl.
*G01C 21/34*        (2006.01)
*B60L 53/66*        (2019.01)
(Continued)

(52) U.S. Cl.
CPC .......... *G01C 21/3492* (2013.01); *B60L 53/66* (2019.02); *B60L 53/68* (2019.02); *B60L 58/13* (2019.02); *G01C 21/3469* (2013.01); *G01C 21/3617* (2013.01); *B60L 2240/62* (2013.01); *B60L 2240/68* (2013.01); *B60L 2260/52* (2013.01)

(58) Field of Classification Search
CPC .......... B60L 58/12; B60L 53/66; B60L 53/68; B60L 2240/72; B60L 2240/80; B60L 53/305; B60L 53/67
See application file for complete search history.

(56) References Cited

U.S. PATENT DOCUMENTS 9,170,118 B2    10/2015 Kiyama et al.
9,851,213 B2    12/2017 Oh et al.
(Continued)

FOREIGN PATENT DOCUMENTS

JP        5928320 B2    6/2016
JP        6459847 B2    1/2019
(Continued)

*Primary Examiner* — Vivek D Koppikar
*Assistant Examiner* — Jeffrey R Chalhoub
(74) *Attorney, Agent, or Firm* — Morgan Lewis & Bockius LLP

(57)        ABSTRACT
A charging station recommendation device and a method therefor include a data collection device that collects real-time information of at least one charging station and real-time information of at least one vehicle associated with the at least one charging station, a data processing device that generates charging information including a congestion of the at least one charging station, based on the real-time information of the at least one charging station and the real-time information of the at least one vehicle, a data storage storing the charging information of the at least one charging station, and a data application device that recommends an optimal charging station among the at least one charging station to a host vehicle, based on the charging information of the at least one charging station, which is stored in the data storage.

18 Claims, 12 Drawing Sheets

(51) Int. Cl.

| | |
|---|---|
| *B60L 53/68* | (2019.01) |
| *B60L 58/13* | (2019.01) |
| *G01C 21/36* | (2006.01) |

(56) References Cited

U.S. PATENT DOCUMENTS

| | | | | |
|---|---|---|---|---|
| 10,124,682 | B2 | 11/2018 | Tsuchiya | |
| 10,737,577 | B2 | 8/2020 | Kapadia et al. | |
| 11,914,840 | B2* | 2/2024 | Quint | B60L 53/63 |
| 12,117,498 | B2* | 10/2024 | Maeda | G01R 31/3648 |
| 2013/0179057 | A1* | 7/2013 | Fisher | B60L 53/66 |
| | | | | 701/1 |
| 2013/0282472 | A1* | 10/2013 | Penilla | B60L 53/80 |
| | | | | 705/14.1 |
| 2014/0163877 | A1 | 6/2014 | Kiyama et al. | |
| 2015/0298565 | A1* | 10/2015 | Iwamura | G06Q 10/04 |
| | | | | 701/22 |
| 2017/0030728 | A1* | 2/2017 | Baglino | G01C 21/3469 |
| 2017/0050527 | A1 | 2/2017 | Tsuchiya | |
| 2017/0168493 | A1* | 6/2017 | Miller | B60L 58/12 |
| 2017/0276503 | A1 | 9/2017 | Oh et al. | |
| 2017/0299401 | A1* | 10/2017 | Choi | G01C 21/3682 |
| 2018/0045533 | A1* | 2/2018 | Jackson | G01C 21/3682 |
| 2018/0143029 | A1* | 5/2018 | Nikulin | G01C 21/3415 |
| 2018/0281612 | A1* | 10/2018 | Perry | H04W 4/80 |
| 2019/0351783 | A1* | 11/2019 | Goei | B60L 53/63 |
| 2019/0383637 | A1* | 12/2019 | Teske | B60L 53/14 |
| 2020/0126322 | A1* | 4/2020 | Kimura | G06F 16/29 |
| 2020/0262307 | A1* | 8/2020 | Rosene | H04L 67/52 |
| 2021/0065073 | A1* | 3/2021 | Maeda | H04L 67/52 |
| 2021/0122257 | A1* | 4/2021 | Lee | B60L 53/62 |
| 2021/0300181 | A1* | 9/2021 | Sakai | B60K 35/00 |
| 2022/0050143 | A1* | 2/2022 | Maeda | G01R 31/382 |
| 2022/0089056 | A1* | 3/2022 | Rajmohan et al. | B60L 53/66 |
| 2022/0187091 | A1* | 6/2022 | Suzuki | G08G 1/00 |
| 2024/0005418 | A1* | 1/2024 | Paik | G06Q 10/02 |

FOREIGN PATENT DOCUMENTS

| | | |
|---|---|---|
| KR | 10-1676689 B1 | 11/2016 |
| KR | 10-2019-0046287 A | 5/2019 |
| KR | 10-2019-0057471 A | 5/2019 |
| KR | 10-2019-0126627 A | 11/2019 |

\* cited by examiner

<u>100</u>

DATA COLLECTION DEVICE
(110)

DATA PROCESSING DEVICE
(120)

DATA STORAGE
(130)

DATA APPLICATION DEVICE
(140)

FIG.1

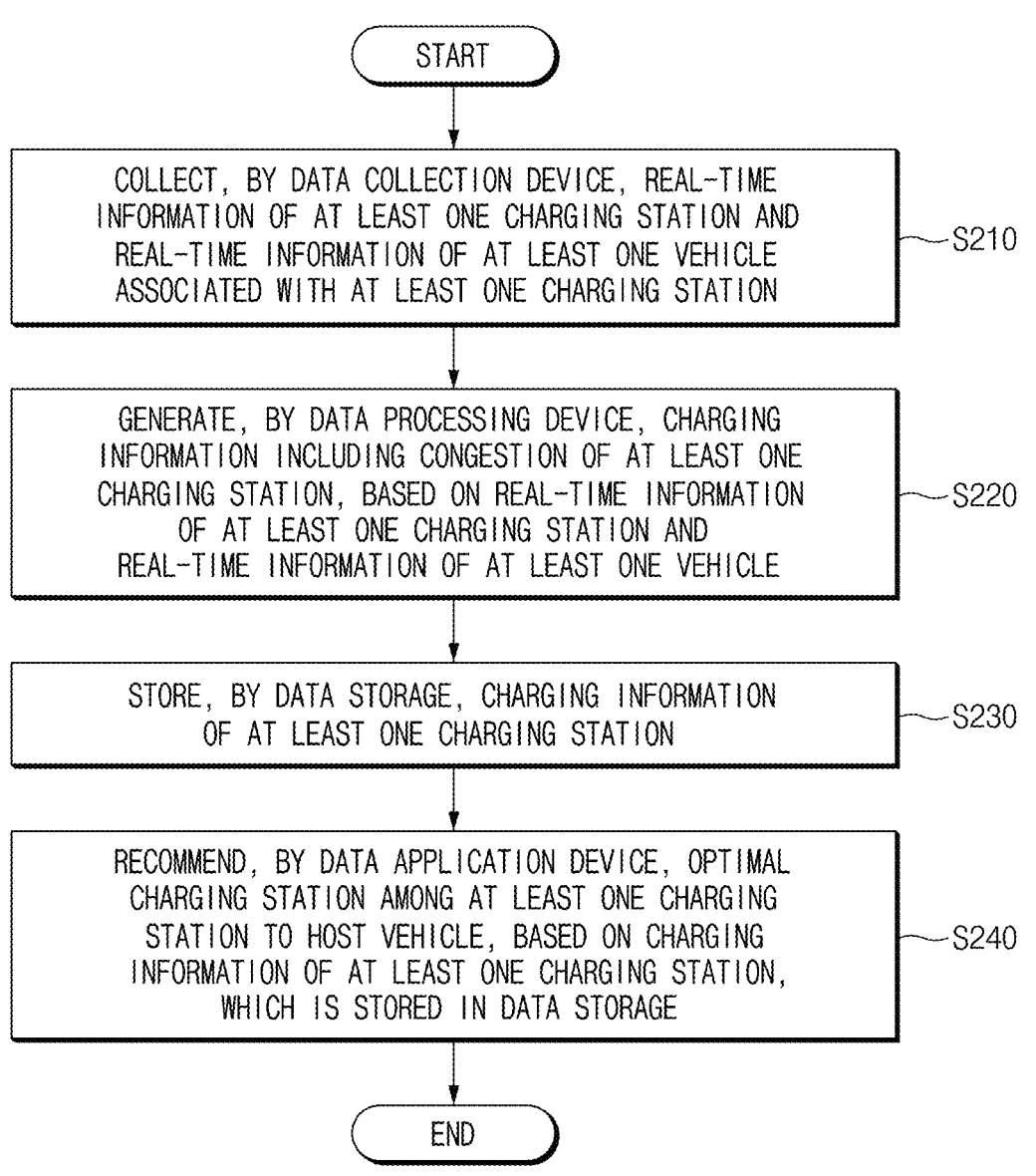

START

COLLECT, BY DATA COLLECTION DEVICE, REAL-TIME INFORMATION OF AT LEAST ONE CHARGING STATION AND REAL-TIME INFORMATION OF AT LEAST ONE VEHICLE ASSOCIATED WITH AT LEAST ONE CHARGING STATION ～S210

GENERATE, BY DATA PROCESSING DEVICE, CHARGING INFORMATION INCLUDING CONGESTION OF AT LEAST ONE CHARGING STATION, BASED ON REAL-TIME INFORMATION OF AT LEAST ONE CHARGING STATION AND REAL-TIME INFORMATION OF AT LEAST ONE VEHICLE ～S220

STORE, BY DATA STORAGE, CHARGING INFORMATION OF AT LEAST ONE CHARGING STATION ～S230

RECOMMEND, BY DATA APPLICATION DEVICE, OPTIMAL CHARGING STATION AMONG AT LEAST ONE CHARGING STATION TO HOST VEHICLE, BASED ON CHARGING INFORMATION OF AT LEAST ONE CHARGING STATION, WHICH IS STORED IN DATA STORAGE ～S240

END

FIG.2

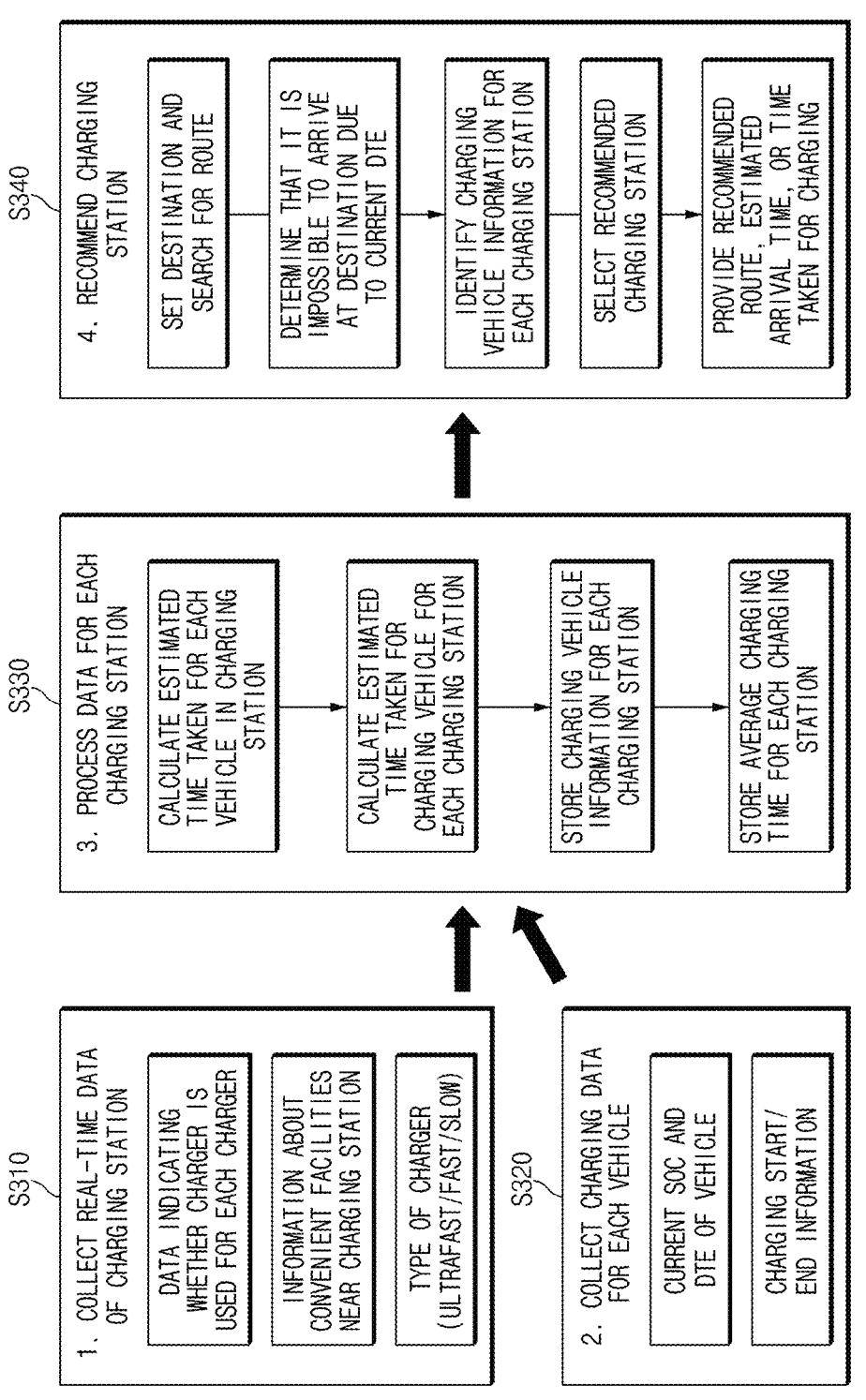

1. COLLECT REAL-TIME DATA OF CHARGING STATION

DATA INDICATING WHETHER CHARGER IS USED FOR EACH CHARGER

INFORMATION ABOUT CONVENIENT FACILITIES NEAR CHARGING STATION

TYPE OF CHARGER (ULTRAFAST/FAST/SLOW)

S320

2. COLLECT CHARGING DATA FOR EACH VEHICLE

CURRENT SOC AND DTE OF VEHICLE

CHARGING START/ END INFORMATION

S330

3. PROCESS DATA FOR EACH CHARGING STATION

CALCULATE ESTIMATED TIME TAKEN FOR EACH VEHICLE IN CHARGING STATION

CALCULATE ESTIMATED TIME TAKEN FOR CHARGING VEHICLE FOR EACH CHARGING STATION

STORE CHARGING VEHICLE INFORMATION FOR EACH CHARGING STATION

STORE AVERAGE CHARGING TIME FOR EACH CHARGING STATION

S340

4. RECOMMEND CHARGING STATION

SET DESTINATION AND SEARCH FOR ROUTE

DETERMINE THAT IT IS IMPOSSIBLE TO ARRIVE AT DESTINATION DUE TO CURRENT DTE

IDENTIFY CHARGING VEHICLE INFORMATION FOR EACH CHARGING STATION

SELECT RECOMMENDED CHARGING STATION

PROVIDE RECOMMENDED ROUTE, ESTIMATED ARRIVAL TIME, OR TIME TAKEN FOR CHARGING

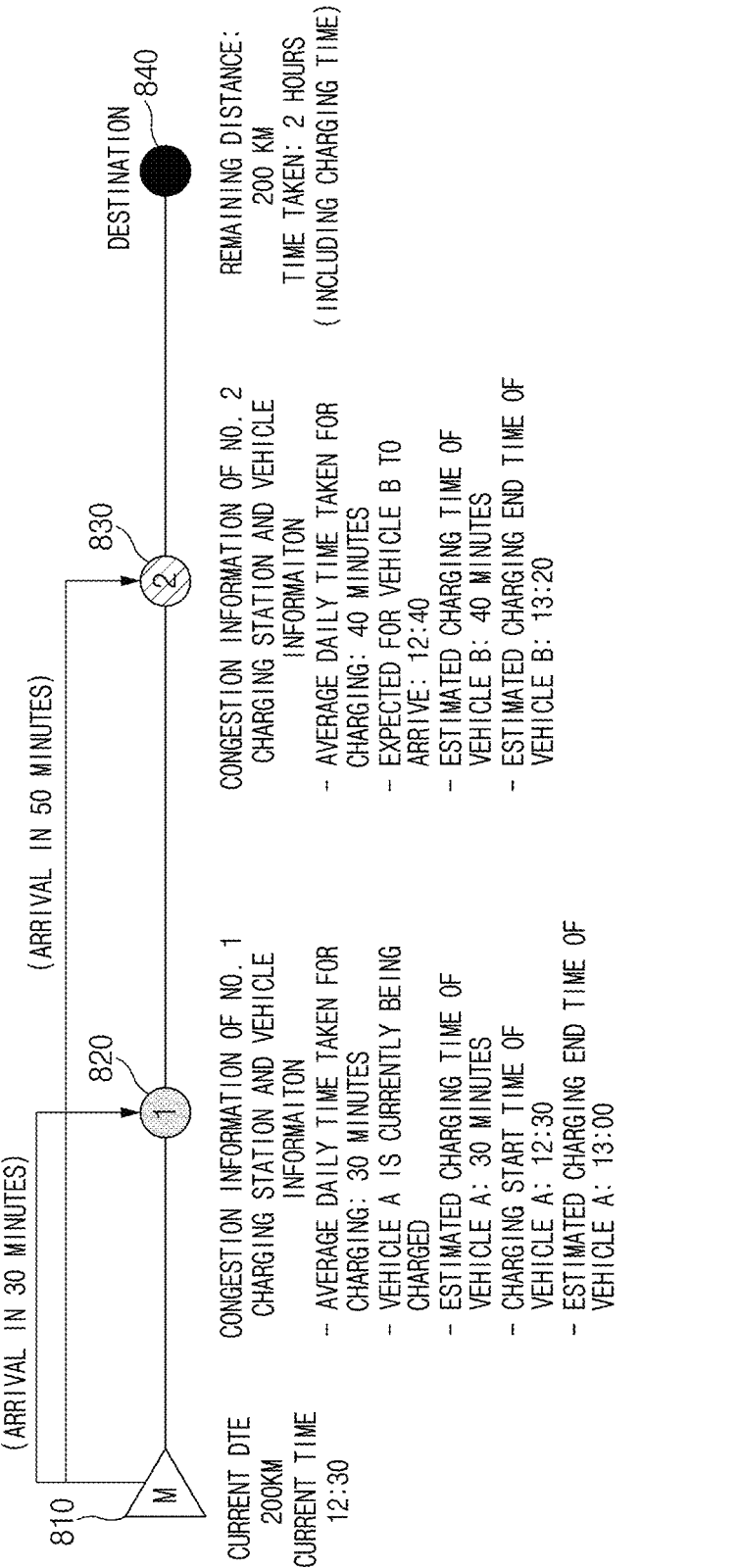

CURRENT DTE
200KM
CURRENT TIME
12:30

(ARRIVAL IN 30 MINUTES)

820

CONGESTION INFORMATION OF NO. 1
CHARGING STATION AND VEHICLE
INFORMAITON

- AVERAGE DAILY TIME TAKEN FOR
  CHARGING: 30 MINUTES
- VEHICLE A IS CURRENTLY BEING
  CHARGED
- ESTIMATED CHARGING TIME OF
  VEHICLE A: 30 MINUTES
- CHARGING START TIME OF
  VEHICLE A: 12:30
- ESTIMATED CHARGING END TIME OF
  VEHICLE A: 13:00

(ARRIVAL IN 50 MINUTES)

830

CONGESTION INFORMATION OF NO. 2
CHARGING STATION AND VEHICLE
INFORMAITON

- AVERAGE DAILY TIME TAKEN FOR
  CHARGING: 40 MINUTES
- EXPECTED FOR VEHICLE B TO
  ARRIVE: 12:40
- ESTIMATED CHARGING TIME OF
  VEHICLE B: 40 MINUTES
- ESTIMATED CHARGING END TIME OF
  VEHICLE B: 13:20

DESTINATION

840

REMAINING DISTANCE:
200 KM
TIME TAKEN: 2 HOURS
(INCLUDING CHARGING TIME)

CHARGING STATION RECOMMENDATION DEVICE AND METHOD THEREFOR

CROSS-REFERENCE TO RELATED APPLICATION

The present application claims priority to Korean Patent Application No. 10-2022-0021688, filed on Feb. 18, 2022, the entire contents of which is incorporated herein for all purposes by this reference.

BACKGROUND OF THE PRESENT DISCLOSURE

Field of the Present Disclosure

The present disclosure relates to a charging station recommendation device and a method therefor, and more particularly, relates to technologies of recommending a charging station using real-time information of the charging station.

Description of Related Art

Recently, interest in electric vehicle and hybrid vehicle has been increased to reduce carbon emissions.

In general, an electric vehicle (EV) refers to a vehicle which utilizes its battery and motor without using petroleum-based fuels and an engine. Such an electric vehicle may operate using electrical energy charged in its battery as the battery loaded into the electric vehicle is charged by a general charging system in the parked state.

When it is necessary to charge the battery when the electric vehicle operates, a driver of the electric vehicle should visit a charging station to charge the battery. However, unlike a general vehicle which utilizes oil as fuel, it takes a relatively long time for the electric vehicle to charge the battery.

Thus, while many electric vehicles are being charged or are waiting for charging in a specific charging station, an electric vehicle which visits the charging station may wait for a long time to charge its battery or it may be difficult for the electric vehicle to be charged as much as it wants.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a charging station recommendation device configured for more accurately providing prediction information related to a charging station, when searching for an optimal charging station and guiding a driver to the optimal charging station using real-time charging station information and vehicle information and a method therefor.

Another aspect of the present disclosure provides a charging station recommendation device configured for controlling a congestion of a charging station using real-time charging station information and vehicle information and a method therefor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a charging station recommendation device may include a data collection device that collects real-time information of at least one charging station and real-time information of at least one vehicle associated with the at least one charging station, a data processing device that generates charging information including a congestion of the at least one charging station, based on the collected real-time information of the at least one charging station and the collected real-time information of the at least one vehicle, a data storage configured for storing the generated charging information of the at least one charging station, and a data application device that recommends an optimal charging station among the at least one charging station to a host vehicle, based on the generated charging information of the at least one charging station, the generated charging information being stored in the data storage.

In an exemplary embodiment of the present disclosure, the data application device may determine a difference between an estimated charging end time of the at least one vehicle and an estimated arrival time when the host vehicle arrives at the optimal charging station and may recommend the optimal charging station when the difference is less than the predetermined time period, when the at least one vehicle is a vehicle which is being charged in the optimal charging station.

In an exemplary embodiment of the present disclosure, the data application device may determine a difference between an estimated charging end time of the at least one vehicle, the estimated charging end time including an estimated arrival time when the at least one vehicle arrives at the optimal charging station, and an estimated arrival time when the host vehicle arrives at the optimal charging station and may recommend the optimal charging station when the difference is less than the predetermined time period, when the at least one vehicle is a vehicle which is traveling to the optimal charging station.

In an exemplary embodiment of the present disclosure, the data processing device may generate a database for the congestion, based on an average time taken for charging in the at least one charging station.

In an exemplary embodiment of the present disclosure, the data processing device may update the database for each predetermined time period, based on the collected real-time information of the at least one charging station and the collected real-time information of the at least one vehicle. The data storage may store the generated charging information including the updated database.

In an exemplary embodiment of the present disclosure, the data application device may recommend the optimal charging station, when it is determined that it is impossible for the host vehicle to arrive at at least one of a destination of the host vehicle or a stop of the host vehicle, based on data of the host vehicle or the at least one of the destination or the stop, after the at least one of the destination or the stop is set. The data of the host vehicle may include at least one of position information of the host vehicle, a current state of charge (SOC) value of the host vehicle, or a distance to empty (DTE) of the host vehicle.

In an exemplary embodiment of the present disclosure, the at least one charging station may include a charging station selected for each predetermined time period among a plurality of charging stations, the charging station in which an estimated arrival time when the host vehicle arrives at each of the charging stations is less than, or less than or equal to, a threshold time.

In an exemplary embodiment of the present disclosure, the data application device may allocate a predetermined value to each of the at least one charging station selected for each predetermined time period among a plurality of charging stations, based on at least one of a charging station preference of a driver, a charger type preference of the driver, a distance to a final destination, or a distance to a stop, and may recommend the optimal charging station, depending on the allocated predetermined value.

In an exemplary embodiment of the present disclosure, the collected real-time information of the at least one charging station may include at least one of state information of a charger in the at least one charging station, a type of the charger, position information of the at least one charging station, or information related to convenient facilities around the at least one charging station.

In an exemplary embodiment of the present disclosure, the state information of the charger may include at least one of whether the charger is charged, whether it is possible to use the charger, or whether the charger fails. The type of the charger may include at least one of an ultrafast type, a fast type, or a slow type.

According to another aspect of the present disclosure, a charging station recommendation method may include collecting, by a data collection device, real-time information of at least one charging station and real-time information of at least one vehicle associated with the at least one charging station, generating, by a data processing device, charging information including a congestion of the at least one charging station, based on the collected real-time information of the at least one charging station and the collected real-time information of the at least one vehicle, storing, by a data storage, the generated charging information of the at least one charging station, and recommending, by a data application device, an optimal charging station among the at least one charging station to a host vehicle, based on the generated charging information of the at least one charging station, the generated charging information being stored in the data storage.

In an exemplary embodiment of the present disclosure, the recommending of the optimal charging station among the at least one charging station to the host vehicle may include determining, by the data application device, a difference between an estimated charging end time of the at least one vehicle and an estimated arrival time when the host vehicle arrives at the optimal charging station and recommending, by the data application device, the optimal charging station when the difference is less than the predetermined time period, when the at least one vehicle is a vehicle which is being charged in the optimal charging station.

In an exemplary embodiment of the present disclosure, the recommending of the optimal charging station among the at least one charging station to the host vehicle may include determining, by the data application device, a difference between an estimated charging end time of the at least one vehicle, the estimated charging end time including an estimated arrival time when the at least one vehicle arrives at the optimal charging station, and an estimated arrival time when the host vehicle arrives at the optimal charging station and recommending, by the data application device, the optimal charging station when the difference is less than the predetermined time period, when the at least one vehicle is a vehicle which is traveling to the optimal charging station.

In an exemplary embodiment of the present disclosure, the generating of the charging information including the congestion of the at least one charging station may include generating, by the data processing device, a database for the congestion, based on an average time taken for charging in the at least one charging station.

In an exemplary embodiment of the present disclosure, the generating of the charging information including the congestion of the at least one charging station may include updating, by the data processing device, the database for each predetermined time period, based on the collected real-time information of the at least one charging station and the collected real-time information of the at least one vehicle. The storing of the generated charging information of the at least one charging station may include storing, by the data storage, the generated charging information including the updated database.

In an exemplary embodiment of the present disclosure, the recommending of the optimal charging station among the at least one charging station to the host vehicle may include recommending, by the data application device, the optimal charging station, when it is determined that it is impossible for the host vehicle to arrive at at least one of a destination of the host vehicle or a stop of the host vehicle, based on data of the host vehicle or the at least one of the destination or the stop, after the at least one of the destination or the stop is set. The data of the host vehicle may include at least one of position information of the host vehicle, a current state of charge (SOC) value of the host vehicle, or a distance to empty (DTE) of the host vehicle.

In an exemplary embodiment of the present disclosure, the at least one charging station may include a charging station selected for each predetermined time period among a plurality of charging stations, the charging station in which an estimated arrival time when the host vehicle arrives at each of the charging stations is less than, or less than or equal to, a threshold time.

In an exemplary embodiment of the present disclosure, the recommending of the optimal charging station among the at least one charging station to the host vehicle may include allocating, by the data application device, a predetermined value to each of the at least one charging station selected for each predetermined time period among a plurality of charging stations, based on at least one of a charging station preference of a driver, a charger type preference of the driver, a distance to a final destination, or a distance to a stop, and recommending, by the data application device, the optimal charging station, in accordance with the allocated predetermined value.

In an exemplary embodiment of the present disclosure, the collected real-time information of the at least one charging station may include at least one of state information of a charger in the at least one charging station, a type of the charger, position information of the at least one charging station, or information related to convenient facilities around the at least one charging station.

In an exemplary embodiment of the present disclosure, the state information of the charger may include at least one of whether the charger is charged, whether it is possible to use the charger, or whether the charger fails. The type of the charger may include at least one of an ultrafast type, a fast type, or a slow type.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 1 is a block diagram of a charging station recommendation device according to an exemplary embodiment of the present disclosure;

FIG. 2 is a flowchart illustrating a charging station recommendation method according to an exemplary embodiment of the present disclosure;

FIG. 3 illustrating recommending a charging station using real-time information of a charging station and real-time information of a vehicle in a charging station recommendation device and a method therefor according to an exemplary embodiment of the present disclosure;

FIG. 8 illustrating an exemplary embodiment of recommending a charging station using congestion information for each charging station and real-time information of a vehicle in a charging station recommendation device and a method therefor according to an exemplary embodiment of the present disclosure;

Figure 4:
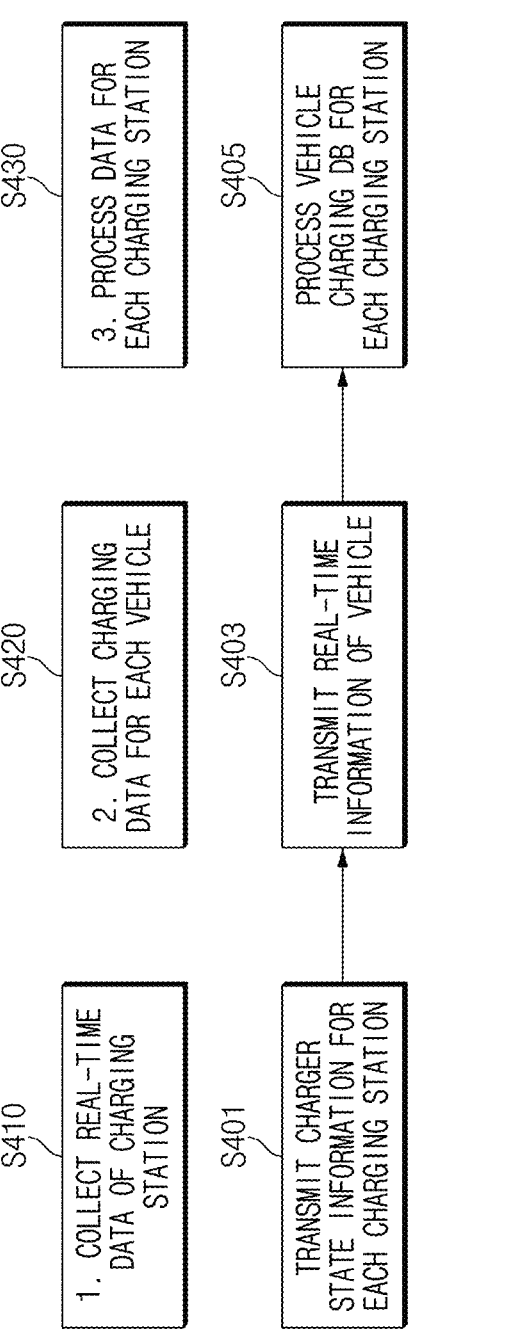
FIG. 4 illustrating collecting and processing real-time information of a charging station and real-time information of a vehicle in a charging station recommendation device and a method therefor according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In the drawings, the same reference numerals will be used throughout to designate the same or equivalent elements. Furthermore, a detailed description of well-known features or functions will be ruled out in order not to unnecessarily obscure the gist of the present disclosure.

In describing the components of the exemplary embodiment of the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various embodiments of the present disclosure will be described in detail with reference to FIG. 1, FIG. 2, FIG. 3, FIG. 4, FIG. 5, FIG. 6, FIG. 7, FIG. 8, FIG. 9, FIG. 10, FIG. 11 and FIG. 12.

FIG. 1 is a block diagram of a charging station recommendation device 100 according to an exemplary embodiment of the present disclosure.

Referring to FIG. 1, the charging station recommendation device 100 according to various exemplary embodiments of the present disclosure may include a data collection device 110, a data processing device 120, a data storage 130, and a data application device 140. In various exemplary embodiments of the present disclosure, the charging station recommendation device 100 may include an additional component other than the components shown in FIG. 1, or may omit at least one of the components shown in FIG. 1.

According to an exemplary embodiment of the present disclosure, the data collection device 110, the data processing device 120, the data storage 130, and the data application device 140 may be controlled by at least one processor included in the charging station recommendation device 100.

According to an exemplary embodiment of the present disclosure, the processor may be electrically connected to the data collection device 110, the data processing device 120, the data storage 130, and the data application device 140 and may electrically control the respective components. The processor may be an electrical circuit which executes instructions of software and may perform a variety of data processing and calculation described below.

In an exemplary embodiment of the present invention, the data collection device 110, the data processing device 120, the data storage 130, and the data application device 140 may be integrated into a processor and executed by the processor.

According to an exemplary embodiment of the present disclosure, the data collection device 110 may collect real-time information of at least one charging station.

According to an exemplary embodiment of the present disclosure, the data collection device 110 may receive pieces of information of one or more charging stations in real time over a wired and wireless network from the one or more charging stations. For example, the data collection device 110 may receive pieces of information of one or more charging stations in seconds over the wired and wireless network from the one or more charging stations.

According to an exemplary embodiment of the present disclosure, the real-time information of the at least one charging station may include at least one of state information of a charger in the at least one charging station, a type of the charger, position information of the at least one charging station, or information related to convenient facilities around the at least one charging station.

For example, the state information of the charger in the at least one charging station may include at least one of whether the charger is charged, whether it is possible to use the charger, or whether the charger fails.

Furthermore, for example, the type of the charger may include at least one of an ultrafast type, a fast type, or a slow type.

According to an exemplary embodiment of the present disclosure, the data collection device 110 may collect real-time information of at least one vehicle associated with the at least one charging station.

According to an exemplary embodiment of the present disclosure, the at least one vehicle associated with the at least one charging station may include at least one of a vehicle which is being charged in the at least one charging station or a vehicle which is traveling to the at least one charging station.

According to an exemplary embodiment of the present disclosure, the data collection device 110 may receive information of the at least one vehicle associated with the at least one charging station in real time over the wired and wireless network. For example, the data collection device 110 may receive pieces of information of one or more vehicles in seconds over the wired and wireless network.

According to an exemplary embodiment of the present disclosure, at least one vehicle in at least one charging station is connected to a charger, the data collection device 110 may receive information of the at least one vehicle in real time.

According to an exemplary embodiment of the present disclosure, the real-time information of the at least one vehicle associated with the at least one charging station may include at least one of position information of the at least one vehicle, a state of charge (SOC) value of the at least one vehicle, a distance to empty (DTE) of the at least one vehicle, a time to empty of the at least one vehicle, a battery charging scheme of the at least one vehicle, information related to a current driving destination of the at least one vehicle, or a current driving route of the at least one vehicle.

According to an exemplary embodiment of the present disclosure, the data processing device 120 may generate charging information of at least one charging station, based on the real-time information of the at least one charging station and the real-time information of at least one vehicle. For example, the charging information of the at least one charging station may include a congestion of the at least one charging station.

According to an exemplary embodiment of the present disclosure, the data processing device 120 may generate a database for the congestion of the at least one charging station, based on an average time taken for charging in the at least one charging station. For example, the database for the at least one charging station may include a congestion pattern.

According to an exemplary embodiment of the present disclosure, when the vehicle is being charged in at least one charging station, the data processing device 120 may generate the database for the congestion using scheduled charging information of the vehicle.

According to an exemplary embodiment of the present disclosure, when the vehicle is traveling to at least one charging station, the data processing device 120 may generate the database for the congestion using an estimated arrival time and scheduled charging information of the vehicle.

According to an exemplary embodiment of the present disclosure, the data processing device 120 may update the database for each predetermined time period, based on the real-time information of the at least one charging station and the real-time information of the at least one vehicle. For example, the data processing device 120 may update the database in seconds or minutes.

According to an exemplary embodiment of the present disclosure, the data processing device 120 may determine an estimated time taken for charging of the vehicle which is being charged in at least one charging station.

According to an exemplary embodiment of the present disclosure, the data processing device 120 may determine an estimated time taken for charging of the vehicle after the vehicle traveling to the at least one charging station arrives at the charging station.

According to an exemplary embodiment of the present disclosure, the data storage 130 may store charging information of at least one charging station. For example, the charging information of the at least one charging station may include a congestion of the at least one charging station.

According to an exemplary embodiment of the present disclosure, the data storage 130 may store the database for the congestion of the at least one charging station, which is generated based on the average time taken for charging in the at least one charging station. For example, the database for the at least one charging station may include a congestion pattern.

According to an exemplary embodiment of the present disclosure, when the vehicle is being charged in at least one charging station, the data storage 130 may store the database for congestion, which is generated using the scheduled charging information of the vehicle.

According to an exemplary embodiment of the present disclosure, when the vehicle is traveling to at least one charging station, the data storage 130 may store the database for congestion, which is generated using the estimated arrival time and the scheduled charging information of the vehicle.

According to an exemplary embodiment of the present disclosure, the data storage 130 may store the database updated for each specified time, based on the real-time information of the at least one charging station and the real-time information of the at least one vehicle. For example, the data storage 130 may store the database updated in seconds or minutes.

According to an exemplary embodiment of the present disclosure, the data storage 130 may store the estimated time taken for charging of the vehicle which is being charged in at least one charging station.

According to an exemplary embodiment of the present disclosure, the data storage 130 may store the estimated time taken for charging of the vehicle after the vehicle traveling to the at least one charging station arrives at the charging station.

According to an exemplary embodiment of the present disclosure, the data application device 140 may recommend an optimal charging station among the at least one charging station to a host vehicle, based on the charging information of the at least one charging station, which is stored in the data storage 130.

According to various exemplary embodiments of the present disclosure, the host vehicle may include a hydrogen vehicle, an electric vehicle, a plug-in hybrid electric vehicle (PHEV), or the like. However, the host vehicle is not limited thereto, which may include a vehicle which performs various types of charging.

According to an exemplary embodiment of the present disclosure, when the at least one vehicle is a vehicle which is being charged in at least one charging station, the data application device 140 may determine a difference between an estimated charging end time of the at least one vehicle and an estimated arrival time when the host vehicle arrives at the optimal charging station.

According to an exemplary embodiment of the present disclosure, when the difference between the estimated charging end time of the at least one vehicle and the estimated arrival time when the host vehicle arrives at the optimal charging station is less than the specified time (e.g., five minutes), the data application device 140 may recommend the at least one charging station for the optimal charging station to the host vehicle.

According to an exemplary embodiment of the present disclosure, when the at least one vehicle is a vehicle which is traveling to at least one charging station, the data application device 140 may determine a difference between an estimated charging end time of the at least one vehicle, which includes an estimated arrival time when the at least one vehicle arrives at the at least one charging station, and an estimated arrival time when the host vehicle arrives at the at least one charging station.

According to an exemplary embodiment of the present disclosure, when the difference between the estimated charging end time of the at least one vehicle, which includes the estimated arrival time when the at least one vehicle arrives at the at least one charging station, and the estimated arrival time when the host vehicle arrives at the at least one charging station is less than the specified time (e.g., five minutes), the data application device 140 may recommend the at least one charging station for the optimal charging station to the host vehicle.

According to an exemplary embodiment of the present disclosure, after at least one of a destination of the host vehicle or a stop of the host vehicle is set, the data application device 140 may determine whether it is possible for the host vehicle to arrive at at least one of the destination or the stop, based on the at least one of data of the host vehicle, information of the destination, or information of the stop.

When it is determined that it is impossible for the host vehicle to arrive at the at least one of the destination or the stop, the data application device 410 may recommend an optimal charging station to the host vehicle.

According to an exemplary embodiment of the present disclosure, the data of the host vehicle may include at least one of position information, a current SoC, or a DTE of the host vehicle.

According to an exemplary embodiment of the present disclosure, the data application device 140 may determine a charging station, in which an estimated arrival time of the host vehicle is less than, or is less than or equal, to a threshold time, among a plurality of charging stations as a primary candidate charging station.

According to an exemplary embodiment of the present disclosure, the data application device 140 may select at least one charging station to be determined as the primary candidate charging station among the plurality of charging stations for each specified time.

According to an exemplary embodiment of the present disclosure, the data application device 140 may allocate a specific value to each of at least one charging station determined as the primary candidate charging station, based on at least one of a charging station preference of a driver, a charger type preference of the driver, a distance to a final destination, or a distance to a stop.

For example, the data application device 140 may allocate the specific value, based on whether the host vehicle is stopped in a rest area when the distance to the final destination or the distance to the stop is a long distance, based on the distance to the final destination or the distance to the stop.

According to an exemplary embodiment of the present disclosure, the data application device 140 may recommend the optimal charging station to the host vehicle, depending on the specific value allocated to each of the at least one charging station determined as the primary candidate charging station.

According to an exemplary embodiment of the present disclosure, the data application device 140 may recommend a charging station having the highest allocated value among the at least one charging station determined as the primary candidate charging station to the host vehicle.

FIG. 2 is a flowchart illustrating a charging station recommendation method according to an exemplary embodiment of the present disclosure. S210 to S240 in an exemplary embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 2, may be briefly described or omitted.

Referring to FIG. 2, in a charging station recommendation device and a method therefor according to an exemplary embodiment of the present disclosure, in S210, a data collection device may collect real-time information of at least one charging station and real-time information of at least one vehicle associated with the at least one charging station.

According to an exemplary embodiment of the present disclosure, the data collection device may collect the real-time information of the at least one charging station.

According to an exemplary embodiment of the present disclosure, the data collection device may receive pieces of information of one or more charging stations in real time over a wired and wireless network from the one or more charging stations.

According to an exemplary embodiment of the present disclosure, the data collection device may collect the real-time information of the at least one vehicle associated with the at least one charging station.

According to an exemplary embodiment of the present disclosure, the at least one vehicle associated with the at least one charging station may include at least one of a vehicle which is being charged in the at least one charging station or a vehicle which is traveling to the at least one charging station.

According to an exemplary embodiment of the present disclosure, the data collection device may receive information of the at least one vehicle associated with the at least one charging station in real time over the wired and wireless network.

According to an exemplary embodiment of the present disclosure, in the charging station recommendation device and the method therefor, in S220, a data processing device may generate charging information including a congestion of the at least one charging station, based on the real-time information of the at least one charging station and the real-time information of the at least one vehicle.

According to an exemplary embodiment of the present disclosure, the data processing device may generate the charging information of the at least one charging station, based on the real-time information of the at least one charging station and the real-time information of at least one vehicle. For example, the charging information of the at least one charging station may include a congestion of the at least one charging station.

According to an exemplary embodiment of the present disclosure, the data processing device may generate a database for the congestion of the at least one charging station, based on an average time taken for charging in the at least one charging station.

According to an exemplary embodiment of the present disclosure, when the vehicle is being charged in the at least one charging station, the data processing device may generate the database for the congestion using scheduled charging information of the vehicle.

According to an exemplary embodiment of the present disclosure, when the vehicle is traveling to the at least one charging station, the data processing device may generate the database for the congestion using an estimated arrival time and scheduled charging information of the vehicle.

According to an exemplary embodiment of the present disclosure, the data processing device may update the database for each predetermined time period, based on the real-time information of the at least one charging station and the real-time information of the at least one vehicle.

According to an exemplary embodiment of the present disclosure, in the charging station recommendation device and the method therefor, in S230, a data storage may store the charging information of the at least one charging station.

According to an exemplary embodiment of the present disclosure, the data storage may store the charging information of the at least one charging station. For example, the charging information of the at least one charging station may include a database for a congestion of the at least one charging station.

According to an exemplary embodiment of the present disclosure, the data storage may store the charging information of the at least one charging station, which is generated based on the real-time information of the at least one charging station and the real-time information of the at least one vehicle.

According to an exemplary embodiment of the present disclosure, the real-time information of the at least one charging station may include at least one of state information of a charger in the at least one charging station, a type of the charger, position information of the at least one charging station, or information related to convenient facilities around the at least one charging station.

Furthermore, according to an exemplary embodiment of the present disclosure, the real-time information of the at least one vehicle may include at least one of position information of the at least one vehicle, an SOC value of the at least one vehicle, a Distance To Empty (DTE) of the at least one vehicle, a time to empty of the at least one vehicle, a battery charging scheme of the at least one vehicle, information related to a current driving destination of the at least one vehicle, or a current driving route of the at least one vehicle.

According to an exemplary embodiment of the present disclosure, in the charging station recommendation device and the method therefor, in S240, a data application device may recommend an optimal charging station among the at least one charging station to a host vehicle, based on the charging information of the at least one charging station, which is stored in the data storage.

According to an exemplary embodiment of the present disclosure, the data application device may determine at least one charging station, in which an estimated arrival time of the host vehicle is less than, or is less than or equal to, a threshold time, among a plurality of charging stations as a primary candidate charging station.

According to an exemplary embodiment of the present disclosure, when there is a vehicle which is being charged in a first charging station among charging stations included in the primary candidate charging station, the data application device may determine whether a difference between an estimated charging end time of the vehicle and an estimated arrival time when the host vehicle arrives at the first charging station is less than a specified time.

According to an exemplary embodiment of the present disclosure, when the difference between the estimated charging end time of the vehicle and the estimated arrival time when the host vehicle arrives at the first charging station is less than the specified time, the data application device may recommend the first charging station for the optimal charging station to the host vehicle.

In detail, for example, when the difference between the estimated charging end time of the vehicle which is being charged in the first charging station and the estimated arrival time when the host vehicle arrives at the first charging station is less than five minutes, the data application device may recommend the first charging station to the host vehicle.

According to an exemplary embodiment of the present disclosure, when there is a vehicle which is traveling to a second charging station among the charging stations included in the primary candidate charging station, the data application device may determine whether a difference between an estimated charging end time of the vehicle and an estimated arrival time when the host vehicle arrives at the second charging station is less than the specified time. In the instant case, the estimated charging end time of the vehicle may include a time taken from the current time point to a time point when the vehicle arrives at the second charging station and a time taken for charging from a time point when the charging is started to a time point when the charging is ended.

According to an exemplary embodiment of the present disclosure, when the difference between the estimated charging end time of the vehicle and the estimated arrival time when the host vehicle arrives at the second charging station is less than the specified time, the data application device may recommend the second charging station for the optimal charging station to the host vehicle.

In detail, for example, when the difference between the estimated charging end time including the estimated arrival time when the host vehicle arrives at the second charging station and the estimated arrival time when the host vehicle arrives at the second charging station is less than five minutes, the data application device may recommend the second charging station for the optimal charging station to the host vehicle.

According to an exemplary embodiment of the present disclosure, the data application device may assign a score, based on at least one of a charging station preference of the driver, a charger type preference of the driver, a distance to a final destination or a stop, or a congestion of the charging station with respect to each of charging stations included in the primary candidate charging station.

According to an exemplary embodiment of the present disclosure, the data application device may determine a charging station having the highest assigned score as the optimal charging station and may recommend the determined charging station to the host vehicle.

FIG. 3 illustrating recommending a charging station using real-time information of a charging station and real-time information of a vehicle in a charging station recommendation device and a method therefor according to an exemplary embodiment of the present disclosure. Contents, which correspond to or are duplicated with the contents described above in conjunction with contents of FIG. 3, may be briefly described or omitted.

S310 to S340 in an exemplary embodiment below may be performed by at least one processor electrically connected to a data collection device, a data processing device, a data storage, and a data application device.

Referring to FIG. 3, in the charging station recommendation device and the method therefor according to an exemplary embodiment of the present disclosure, in S310, the processor may collect real-time data of a charging station.

According to an exemplary embodiment of the present disclosure, the processor may collect data of the charging station, including at least one of data indicating whether a charger is used for each charger, information related to convenient facilities around the charging station, or a type of the charger, in real time. For example, the type of the charger may include at least one of an ultrafast type, a fast type, or a slow type.

According to an exemplary embodiment of the present disclosure, in S320, the processor may collect charging data for each vehicle.

According to an exemplary embodiment of the present disclosure, the processor may collect charging data for each vehicle, which include at least one of a current SOC value of the vehicle, a DTE, charging start information of the vehicle, or charging end information of the vehicle. For example, the charging start information may include a time when charging is started, and the charging end information may include a time when the charging is ended.

According to an exemplary embodiment of the present disclosure, in S330, the processor may process data for each charging station.

According to an exemplary embodiment of the present disclosure, the processor is configured to determine an estimated time taken for each vehicle in the charging station. According to an exemplary embodiment of the present disclosure, the processor is configured to determine an estimated time take for charging (e.g., one hour) when the vehicle is charged in at least one charging station, using congestion pattern data of the at least one charging station.

According to an exemplary embodiment of the present disclosure, the processor is configured to determine an estimated time taken for a charging vehicle for each charging station. According to an exemplary embodiment of the present disclosure, the processor is configured to determine an estimated time taken for charging of a vehicle which is being charged in at least one charging station.

According to an exemplary embodiment of the present disclosure, the processor may store information of the charging vehicle for each charging station in a memory. According to an exemplary embodiment of the present disclosure, the processor may store charging vehicle information including a current SOC value of the vehicle which is being charged in the at least one charging station, a DTE, and an estimated time taken for charging of the vehicle in the memory.

According to an exemplary embodiment of the present disclosure, the processor may store an average charging time for each charging station in the memory. According to an exemplary embodiment of the present disclosure, the processor may store information related to an average daily time taken for charging in the at least one charging station in the memory.

According to an exemplary embodiment of the present disclosure, in S340, the processor may recommend a charging station to a host vehicle.

According to an exemplary embodiment of the present disclosure, when searching for a route in response to setting (or inputting) a destination or a stop, the processor is configured to determine whether it is possible to arrive at the destination or the stop based on a current DTE.

According to an exemplary embodiment of the present disclosure, when it is determined that it is impossible to arrive at the destination or the stop, the processor may identify information of the charging vehicle for each charging station.

In detail, when it is determined that charging is required to arrive at the destination or the stop based on the current DTE, the processor may identify information of the vehicle which is being charged in the at least one charging station. For example, the information of the vehicle may include charging start information of the vehicle and charging end information of the vehicle.

According to an exemplary embodiment of the present disclosure, the processor may select a recommended charging station (or an optimal charging station). According to an exemplary embodiment of the present disclosure, the processor may select one charging station as a recommended charging station, based on identifying the information of the vehicle which is being charged in the at least one charging station.

According to an exemplary embodiment of the present disclosure, the processor may provide the host vehicle with at least one of a recommended route, an estimated arrival time, or a time taken for charging.

According to an exemplary embodiment of the present disclosure, the processor may provide the host vehicle with at least one of a recommended route to the recommended charging station (or the optimal charging station) and an estimated arrival time to the recommended charging station (or the optimal charging station) or a time taken for charging in real time.

According to an exemplary embodiment of the present disclosure, the at least one of the recommended route to the recommended charging station and the estimated arrival time to the recommended charging station or the time taken for charging may be provided to a driver by a navigation device provided in the host vehicle.

FIG. 4 illustrating collecting and processing real-time information of a charging station and real-time information of a vehicle in a charging station recommendation device and a method therefor according to an exemplary embodiment of the present disclosure. Contents, which correspond to or are duplicated with the contents described above in conjunction with contents of FIG. 4, may be briefly described or omitted.

S410 to S430 in an exemplary embodiment below may be performed by at least one processor electrically connected to a data collection device, a data processing device, a data storage, and a data application device. Herein, in an exemplary embodiment below, S401, S403, and S405 may be performed by at least one processor in S410, S420, and S430, respectively.

Referring to FIG. 4, in the charging station recommendation device and the method therefor according to an exemplary embodiment of the present disclosure, in S401, the processor may receive charger state information for each charging station in collecting real-time data of a charging station in S410.

For example, the real-time data of the charging station may include basic information of the charging station (e.g., information related to a position of the charging station or information related to convenient facilities around the charging station) and information related to a state of the charging station.

For example, the information related to the state of the charger may include at least one of whether the charger is charged, whether it is possible to use the charger, or whether the charger fails.

According to an exemplary embodiment of the present disclosure, in S403, the processor may receive real-time information of the vehicle in collecting charging data for each vehicle in S420.

According to an exemplary embodiment of the present disclosure, the processor may receive real-time information of the vehicle when a destination of the vehicle is set.

For example, the real-time information of the vehicle when the destination of the vehicle is set may include at least one of a current SOC value of the vehicle, charging station passing information, information scheduled to arrive at the charging station, or an estimated charging time after the vehicle arrives at the charging station.

According to an exemplary embodiment of the present disclosure, the processor may receive real-time information of the vehicle, when the vehicle arrives at the destination.

For example, the real-time information of the vehicle when the vehicle arrives at the destination may include at least one of a current SOC value of the vehicle, current Global Positioning System (GPS) position information, charging station passing information, information scheduled to arrive at the charging station, or an estimated charging time after the vehicle arrives at the charging station, a charger coupling time, or an estimated charging time.

According to an exemplary embodiment of the present disclosure, in S405, the processor may process a vehicle charging DB for each charging station in processing data for each charging station in S430.

According to an exemplary embodiment of the present disclosure, the processor may process a DB for vehicle information for each charger, a charging start time, an estimated charging time, or a charging end time.

According to an exemplary embodiment of the present disclosure, the processor may process an average charging time DB for each charging station.

According to an exemplary embodiment of the present disclosure, the processor may process and store a DB (e.g., a pattern DB) for an average charging time of the charging station with respect to an estimated charging time for each vehicle in a memory. For example, the average charging time of the charging station may refer to an average daily time taken for charging in the charging station.

Figure 5:
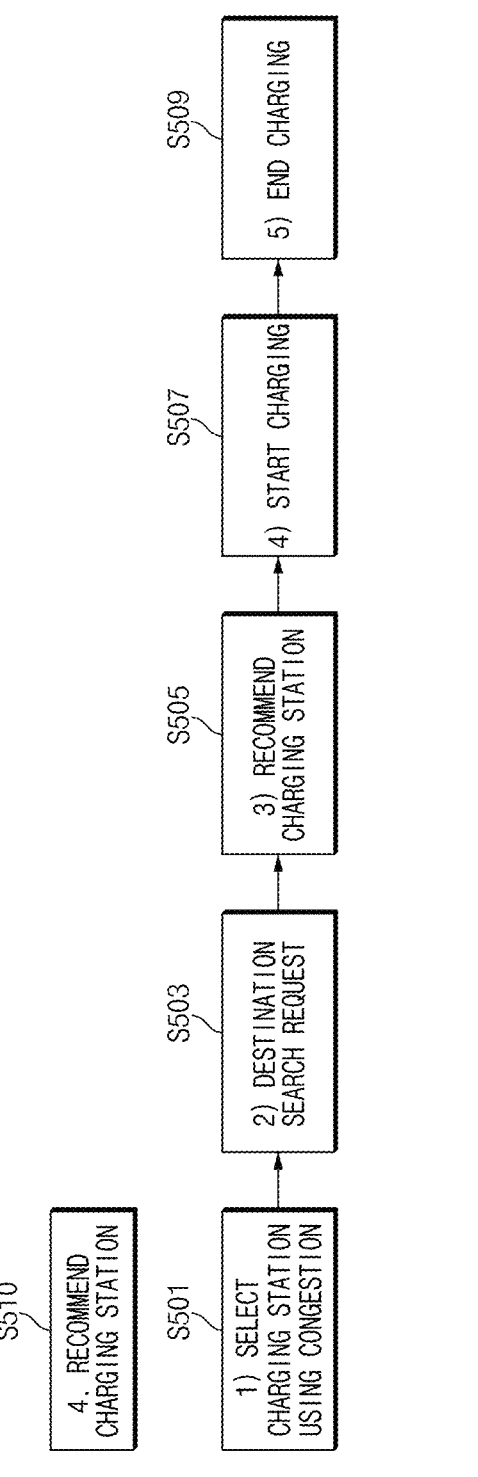
FIG. 5 illustrating recommending a charging station using charging information of a charging station in a charging station recommendation device and a method therefor according to an exemplary embodiment of the present disclosure.

FIG. 5 illustrating recommending a charging station using charging information of a charging station in a charging station recommendation device and a method therefor according to an exemplary embodiment of the present disclosure. Contents, which correspond to or are duplicated with the contents described above in conjunction with contents of FIG. 5, may be briefly described or omitted.

S510 in an exemplary embodiment below may be performed by at least one processor electrically connected to a data collection device, a data processing device, a data storage, and a data application device. Furthermore, in an exemplary embodiment below, S501 to S509 may be performed by at least one processor in S510.

According to an exemplary embodiment of the present disclosure, in S501, the processor may select a charging station using congestion in recommending a charging station in S510.

According to an exemplary embodiment of the present disclosure, the processor may primarily select a recommended charging station using a congestion pattern database. For example, the processor may primarily select at least one charging station, a congestion of which is less than, or less than or equal to, a certain level, based on the congestion pattern database. Hereinafter, in the present disclosure, the at least one charging station primarily selected based on the congestion pattern database may be referred to as a primary candidate charging station.

According to an exemplary embodiment of the present disclosure, in S503, the processor may identify a destination search request in recommending the charging station S510.

According to an exemplary embodiment of the present disclosure, when the vehicle travels along a route from the current position to the destination in response to the destination search request, the processor is configured to determine whether it is possible for the vehicle to arrive at the destination. In the instant case, whether it is possible for the vehicle to arrive at the destination may be determined based on at least one of a current position of the vehicle, a current SOC value of the vehicle, or a DTE of the vehicle.

According to an exemplary embodiment of the present disclosure, the processor is configured to determine an estimated arrival time when the host vehicle arrives at a primary candidate charging station, with respect to a congestion pattern.

According to an exemplary embodiment of the present disclosure, in S505, the processor may recommend the charging station in recommending the charging station in S510.

According to an exemplary embodiment of the present disclosure, the processor may identify information of a vehicle which is being charged in the primary candidate charging station or is traveling to the primary candidate charging station.

According to an exemplary embodiment of the present disclosure, when identifying the information of the vehicle which is being charged in the primary candidate charging station and when a difference between an estimated charging end time of the vehicle which is being charged and an estimated arrival time when the host vehicle arrives at the primary candidate charging station is less than a specified time (e.g., five minutes), the processor may recommend the charging station to the host vehicle.

According to an exemplary embodiment of the present disclosure, when identifying the vehicle which is traveling to the primary candidate charging station and when a difference between an estimated charging end time including an estimated arrival time when the vehicle which is traveling arrives at the primary candidate charging station and an estimated arrival time when the host vehicle arrives at the primary candidate charging station is less than the specified time (e.g., five minutes), the processor may recommend the charging station to the host vehicle.

According to an exemplary embodiment of the present disclosure, in S507, the processor may identify that the charging of the vehicle is started in recommending the charging station in S510.

According to an exemplary embodiment of the present disclosure, when the vehicle starts to be charged after arriving at the charging station, the processor may receive a charging start time.

According to an exemplary embodiment of the present disclosure, when the vehicle starts to be charged after arriving at the charging station, the processor may receive a time when the charging is completed.

According to an exemplary embodiment of the present disclosure, in S509, the processor may identify that the charging of the vehicle is ended in recommending the charging station in S510.

According to an exemplary embodiment of the present disclosure, when the charging of the vehicle is completed, the processor may receive a charging completion time.

Figure 6:
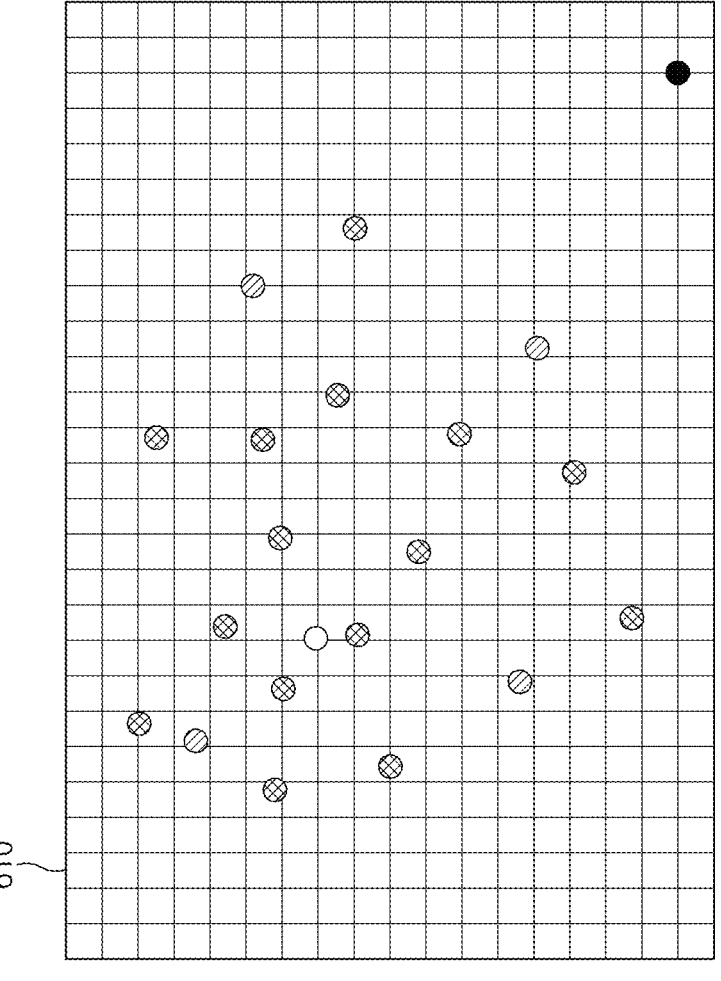
FIG. 6 illustrating a processed charging station congestion pattern database in a charging station recommendation device and a method therefor according to an exemplary embodiment of the present disclosure.

FIG. 6 illustrating a processed charging station congestion pattern database 610 in a charging station recommendation device and a method therefor according to an exemplary embodiment of the present disclosure.

Referring to FIG. 6, in the charging station recommendation device and the method therefor according to an exemplary embodiment of the present disclosure, a data processing device may process the congestion pattern database 610 of a charging station.

According to an exemplary embodiment of the present disclosure, the data processing device may configure an average charging time for each charging station as the congestion pattern database 610.

According to an exemplary embodiment of the present disclosure, the data processing device may configure an average charging time of a plurality of charging stations, determined based on a current position and a destination position of a vehicle, as the congestion pattern database 610.

According to an exemplary embodiment of the present disclosure, the data processing device may configure an average charging time of primary candidate charging stations, in which the estimated arrival time of the vehicle is less than, or less than or equal to, a threshold time, among the plurality of charging stations as the congestion pattern database 610.

For example, the primary charging station may include a charging station, a congestion of which is less than, or less than or equal to, a certain level, among charging stations, in which the estimated arrival time of the vehicle is less than, or less than or equal to, the threshold time.

According to an exemplary embodiment of the present disclosure, the data processing device may update the congestion pattern database 610 for each specified time. For example, the data processing device may update the congestion pattern database 610 every minute. The primary candidate charging station may be updated every minute.

Figure 7:
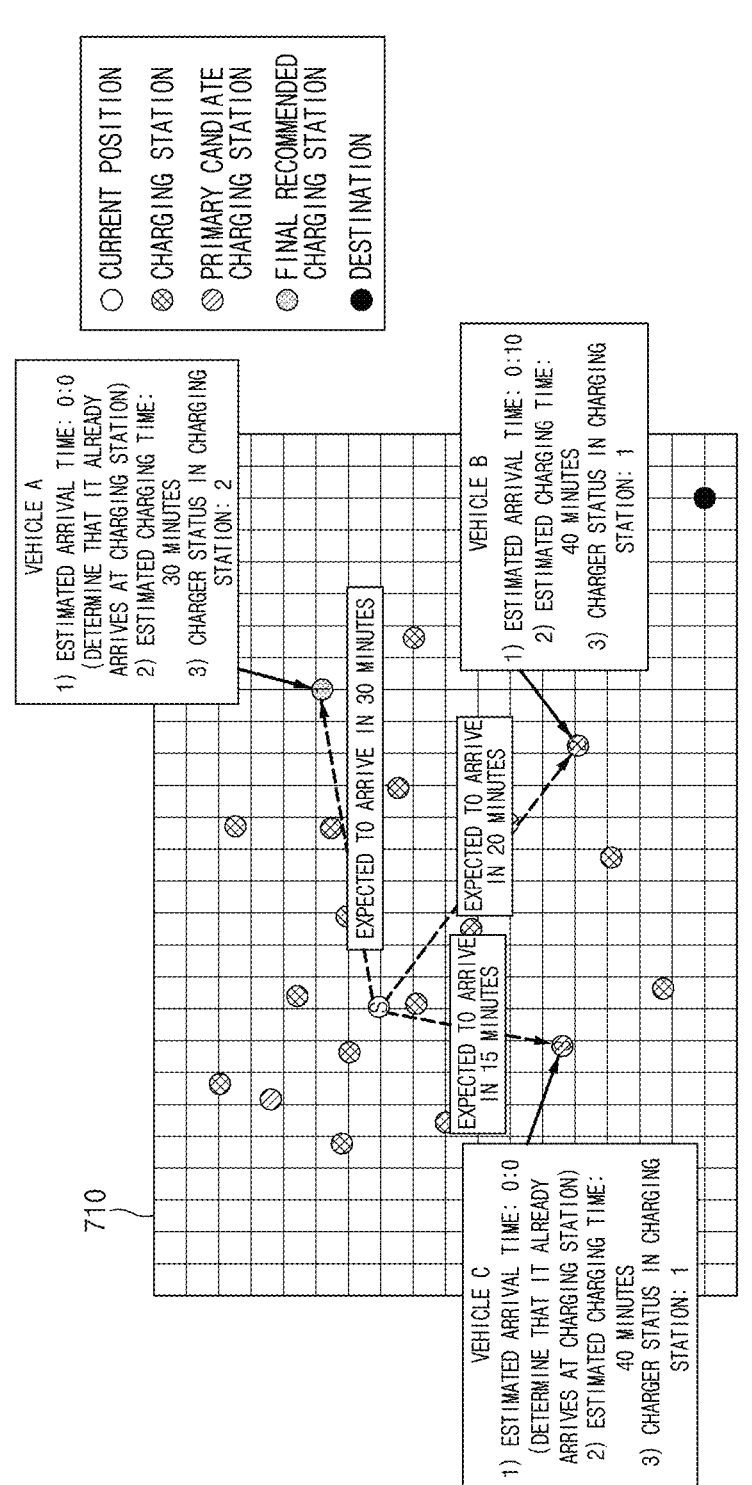
FIG. 7 illustrating a processed charging station congestion pattern database and real-time information of a vehicle associated with a charging station in a charging station recommendation device and a method therefor according to an exemplary embodiment of the present disclosure.

FIG. 7 illustrating a processed charging station congestion pattern database 710 and real-time information of a vehicle associated with a charging station in a charging station recommendation device and a method therefor according to an exemplary embodiment of the present disclosure.

Referring to FIG. 7, in the charging station recommendation device and the method therefor according to an exemplary embodiment of the present disclosure, a data processing device may process a congestion pattern database 710 of a charging station and may match the processed congestion pattern database 710 with information of a vehicle associated with the charging station.

According to an exemplary embodiment of the present disclosure, the data processing device may configure an average charging time for each charging station as the congestion pattern database 710.

According to an exemplary embodiment of the present disclosure, the data processing device may configure an average charging time of a plurality of charging stations, determined based on a current position and a destination position of a vehicle, as the congestion pattern database 710.

According to an exemplary embodiment of the present disclosure, the data processing device may configure an average charging time of primary candidate charging stations, in which the estimated arrival time of the vehicle is less than, or less than or equal to, the threshold time, among the plurality of charging stations as the congestion pattern database 710.

According to an exemplary embodiment of the present disclosure, the data processing device may match at least one charging station selected as the primary charging station with information of the vehicle associated with the primary charging station to configure the congestion pattern database 710.

According to an exemplary embodiment of the present disclosure, a first charging station among the at least one primary candidate charging station may be matched with information of vehicle A which is being charged in the first charging station. In the instant case, the information of vehicle A may include an estimated charging time of vehicle A.

According to an exemplary embodiment of the present disclosure, a second charging station among the at least one primary candidate charging station may be matched with information of vehicle B which is traveling to the second charging station. In the instant case, the information of vehicle B may include an estimated arrival time and an estimated charging time of vehicle B.

According to an exemplary embodiment of the present disclosure, a third charging station among the at least one primary candidate charging station may be matched with information of vehicle C which is being charged in the third charging station. In the instant case, the information of vehicle C may include an estimated charging time of vehicle C.

According to an exemplary embodiment of the present disclosure, the data processing device may mix the information of the vehicle, which is matched with each of the primary candidate charging stations, real-time information of the charging station, and information related to an estimated arrival time from the current position to the charging station to process data. For example, the real-time information of the charging station may include a charger status in the charging station. In detail, for example, the charger status in the charging station may include the number of chargers available in the charging station.

According to an exemplary embodiment of the present disclosure, congestion data of the first charging station may include that the estimated arrival time from the current position is 30 minutes, that the estimated charging time of vehicle A which is being charged in the charging station is 30 minutes, and that the number of charging stations available in the charging station is two.

According to an exemplary embodiment of the present disclosure, congestion data of the second charging station may include that the estimated arrival time from the current position is 20 minutes, that the estimated arrival time and the estimated charging time of vehicle B which is traveling to the charging station are respectively 10 minutes and 40 minutes, and that the number of charging stations available in the charging station is one.

According to an exemplary embodiment of the present disclosure, congestion data of the third charging station may include that the estimated arrival time from the current position is 15 minutes, that the estimated charging time of vehicle C which is being charged in the charging station is 40 minutes, and that the number of charging stations available in the charging station is one.

According to an exemplary embodiment of the present disclosure, a data storage may store the congestion pattern database 710 in which the information of the vehicle, which is matched with each of the primary candidate charging stations, real-time information of the charging station, and information related to an estimated arrival time from the current position to the charging station are mixed.

According to an exemplary embodiment of the present disclosure, a data application device may recommend the most optimal charging station to the vehicle, based on the congestion pattern database 710 stored in the data storage.

According to an exemplary embodiment of the present disclosure, the data application device may determine the first charging station, in which the estimated arrival time from the current position is 30 minutes, the estimated charging time of vehicle A which is being charged in the charging station is 30 minutes, and the number of charging stations available in the charging station is two, as an optimal charging station.

FIG. 8 illustrating an exemplary embodiment of recommending a charging station using congestion information for each charging station and real-time information of a vehicle in a charging station recommendation device and a method therefor according to an exemplary embodiment of the present disclosure.

Referring to FIG. 8, in the charging station recommendation device and the method therefor according to an exemplary embodiment of the present disclosure, when it is determined that it is impossible for a host vehicle (e.g., vehicle M) 810 to arrive at a destination 840, in response that the destination 840 of the host vehicle (e.g., vehicle M) 810 is set, the charging station recommendation device may recommend an optimal charging station to vehicle M 810 using congestion information for each charging station and vehicle information.

According to an exemplary embodiment of the present disclosure, when it is determined that it is impossible for vehicle M 810 to arrive at the destination 840, in response that the destination 840 of vehicle M 810 is set, the charging station recommendation device may recommend an optimal charging station to vehicle M 810 with respect to data of vehicle M 810 and a current time. For example, the data of vehicle M 810 may include a DTE.

According to an exemplary embodiment of the present disclosure, when the DTE of vehicle M 810 is less than, or less than or equal to, a remaining distance to the destination 840, the charging station recommendation device may determine that it is impossible for vehicle M 810 to arrive at the destination 840.

For example, the remaining distance to the set destination 840 may be 200 km, and a time taken for arrival may be two hours. Furthermore, for example, a DTE of vehicle M 810 may be 200 km, and a destination search request time may be 12:30. In the instant case, the charging station recommendation device may determine that it is impossible for vehicle M 810 to arrive at the destination 840.

According to an exemplary embodiment of the present disclosure, the charging station recommendation device may recommend an optimal charging station to vehicle M 810 based on congestion information of the charging station and vehicle information.

According to an exemplary embodiment of the present disclosure, congestion information and vehicle information of each of the first charging station 820 and the second charging station 830 may include at least one of an average daily time taken for charging, an estimated charging time, a charging start time, or a charging end time.

For example, an average daily time taken for charging in the first charging station 820 may be 30 minutes, and vehicle A may be currently being charged in the first charging station 820. Furthermore, for example, the estimated charging time of vehicle A may be 30 minutes, the charging start time of vehicle A may be 12:30, and the estimated charging end time of vehicle A may be 13:00. Furthermore, for example, the estimated arrival time when vehicle M 810 arrives at the first charging station 820 may be 30 minutes.

Furthermore, for example, an average daily time taken for charging in the second charging station 830 may be 40 minutes, and vehicle B may be traveling to the second charging station 830. Furthermore, for example, the estimated charging time of vehicle B may be 40 minutes, the estimated arrival time of vehicle B may be 12:40, and the estimated charging end time of vehicle B may be 13:20. Furthermore, for example, the estimated arrival time when vehicle M 810 arrives at the second charging station 830 may be 50 minutes.

In the above-mentioned embodiment, the charging station recommendation device may recommend the first charging station 820, in which vehicle M 810 is configured to start to be charged without waiting, between the first charging station 820 and the second charging station 830 to vehicle M 810.

Figure 9:
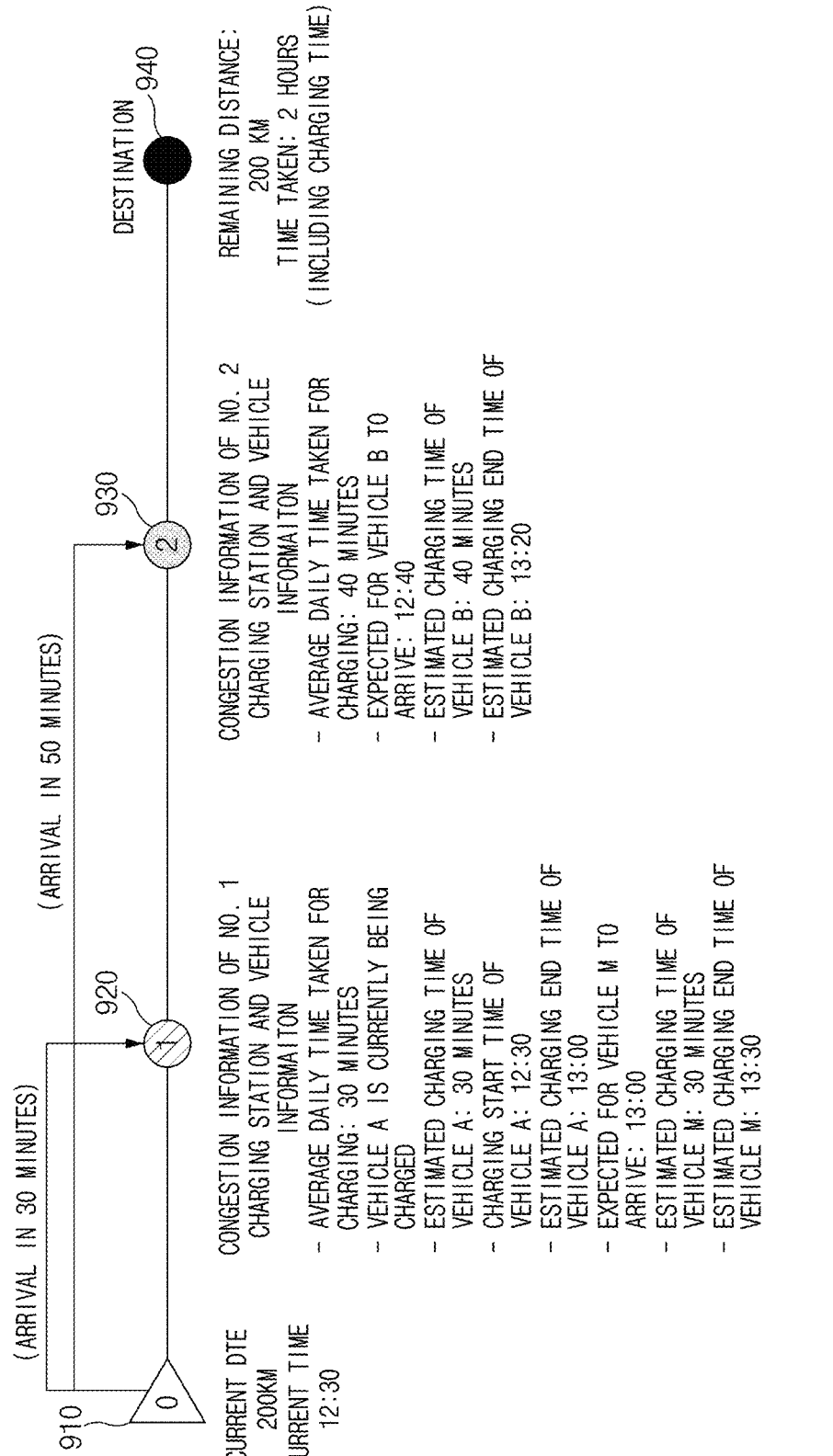
FIG. 9 illustrating another exemplary embodiment of recommending a charging station using congestion information for each charging station and real-time information of a vehicle in a charging station recommendation device and a method therefor according to an exemplary embodiment of the present disclosure.

FIG. 9 illustrating another exemplary embodiment of recommending a charging station using congestion information for each charging station and real-time information of a vehicle in a charging station recommendation device and a method therefor according to an exemplary embodiment of the present disclosure.

Referring to FIG. 9, in the charging station recommendation device and the method therefor according to an exemplary embodiment of the present disclosure, when it is determined that it is impossible for a host vehicle (e.g., vehicle O) 910 to arrive at a destination 940, in response that the destination 840 of the host vehicle (e.g., vehicle O) 910 is set, the charging station recommendation device may recommend an optimal charging station to vehicle O 910 using congestion information for each charging station and vehicle information.

According to an exemplary embodiment of the present disclosure, when it is determined that it is impossible for vehicle O 910 to arrive at the destination 940, in response that the destination 940 of vehicle O 910 is set, the charging station recommendation device may recommend an optimal charging station to vehicle O 910 with respect to data of vehicle O 910 and a current time. For example, the data of vehicle O 910 may include a DTE.

According to an exemplary embodiment of the present disclosure, when the DTE of vehicle O 910 is less than, or less than or equal to, a remaining distance to the destination 940, the charging station recommendation device may determine that it is impossible for vehicle O 910 to arrive at the destination 940.

For example, the remaining distance to the set destination 940 may be 200 km, and a time taken for arrival may be two hours. Furthermore, for example, a DTE of vehicle O 910 may be 200 km, and a destination search request time may be 12:30. In the instant case, the charging station recommendation device may determine that it is impossible for vehicle O 910 to arrive at the destination 940.

According to an exemplary embodiment of the present disclosure, the charging station recommendation device may recommend an optimal charging station to vehicle O 910 based on congestion information of the charging station and vehicle information.

According to an exemplary embodiment of the present disclosure, congestion information and vehicle information of each of the first charging station 920 and the second charging station 930 may include at least one of an average daily time taken for charging, an estimated charging time, a charging start time, or a charging end time.

For example, the average daily time taken for charging in the first charging station 920 may be 30 minutes, and vehicle A may be currently being charged in the first charging station 920. Furthermore, for example, the estimated charging time of vehicle A may be 30 minutes, the charging start time of vehicle A may be 12:30, and the estimated charging end time of vehicle A may be 13:00.

Furthermore, for example, vehicle M may be currently traveling to the first charging station 920. Furthermore, for example, the estimated charging time of vehicle M may be 30 minutes, the estimated arrival time of vehicle M may be 13:00, and the estimated charging end time of vehicle M may be 13:30. Furthermore, for example, the estimated arrival time when vehicle O 910 arrives at the first charging station 920 may be 30 minutes.

Furthermore, for example, the average daily time taken for charging in the second charging station 930 may be 40 minutes, and vehicle B may be currently traveling to the second charging station 930. Furthermore, for example, the estimated charging time of vehicle B may be 40 minutes, the estimated arrival time of vehicle B may be 12:40, and the estimated charging end time of vehicle B may be 13:20.

Furthermore, for example, the estimated arrival time when vehicle O 910 arrives at the second charging station 930 may be 50 minutes.

In the above-mentioned embodiment, the charging station recommendation device may recommend the second charging station 930, in which vehicle O 910 is configured to start to be charged without waiting, between the first charging station 920 and the second charging station 930 to vehicle O 910.

Figure 10:
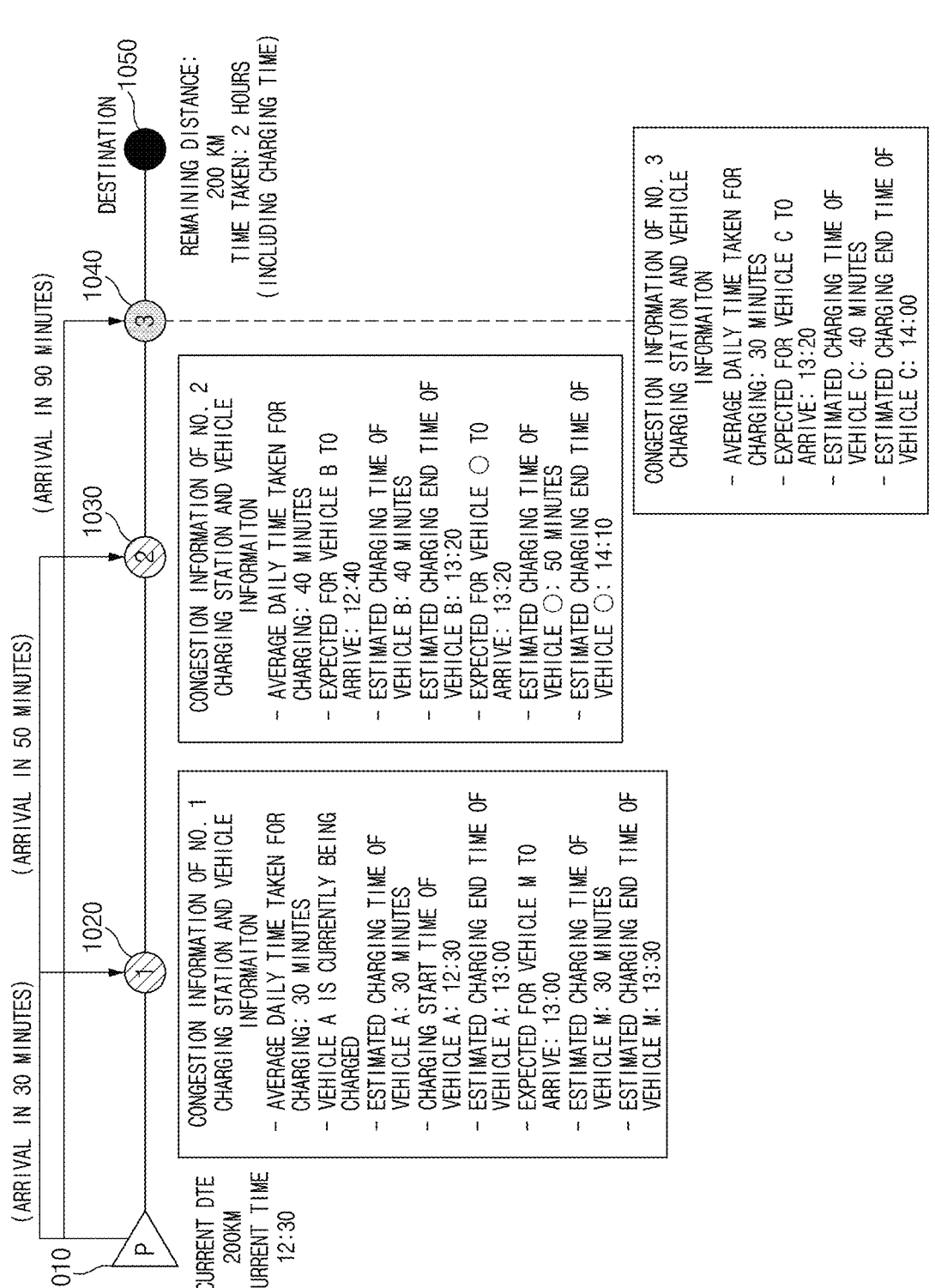
FIG. 10 illustrating another exemplary embodiment of recommending a charging station using congestion information for each charging station and real-time information of a vehicle in a charging station recommendation device and a method therefor according to an exemplary embodiment of the present disclosure.

FIG. 10 illustrating another exemplary embodiment of recommending a charging station using congestion information for each charging station and real-time information of a vehicle in a charging station recommendation device and a method therefor according to an exemplary embodiment of the present disclosure.

Referring to FIG. 10, in the charging station recommendation device and the method therefor according to an exemplary embodiment of the present disclosure, when it is determined that it is impossible for a host vehicle (e.g., vehicle P) 1010 to arrive at a destination 1050, in response that the destination 1050 of the host vehicle (e.g., vehicle P) 1010 is set, the charging station recommendation device may recommend an optimal charging station to vehicle P 1010 using congestion information for each charging station and vehicle information.

According to an exemplary embodiment of the present disclosure, when it is determined that it is impossible for vehicle P 1010 to arrive at the destination 1050, in response that the destination 1050 of vehicle P 1010 is set, the charging station recommendation device may recommend an optimal charging station to vehicle P 910 with respect to data of vehicle P 1010 and a current time. For example, the data of vehicle P 1010 may include a DTE.

According to an exemplary embodiment of the present disclosure, when the DTE of vehicle P 1010 is less than, or less than or equal to, a remaining distance to the destination 1050, the charging station recommendation device may determine that it is impossible for vehicle P 1010 to arrive at the destination 1050.

For example, the remaining distance to the set destination 1050 may be 200 km, and a time taken for arrival may be two hours. Furthermore, for example, a DTE of vehicle P 1010 may be 200 km, and a destination search request time may be 12:30. In the instant case, the charging station recommendation device may determine that it is impossible for vehicle P 1010 to arrive at the destination 1050.

According to an exemplary embodiment of the present disclosure, the charging station recommendation device may recommend an optimal charging station to vehicle P 1010 based on congestion information of the charging station and vehicle information.

According to an exemplary embodiment of the present disclosure, congestion information and vehicle information of each of the first charging station 1020, the second charging station 1030, and the third charging station 1040 may include at least one of an average daily time taken for charging, an estimated charging time, a charging start time, or a charging end time.

For example, the average daily time taken for charging in the first charging station 1020 may be 30 minutes, and vehicle A may be currently being charged in the first charging station 1020. Furthermore, for example, the estimated charging time of vehicle A may be 30 minutes, the charging start time of vehicle A may be 12:30, and the estimated charging end time of vehicle A may be 13:00.

Furthermore, for example, vehicle M may be currently traveling to the first charging station 1020. Furthermore, for example, the estimated charging time of vehicle M may be 30 minutes, the estimated arrival time of vehicle M may be 13:00, and the estimated charging end time of vehicle M may be 13:30. Furthermore, for example, the estimated arrival time when vehicle P 1010 arrives at the first charging station 1020 may be 30 minutes.

Furthermore, for example, the average daily time taken for charging in the second charging station 1030 may be 40 minutes, and vehicle B may be currently traveling to the second charging station 1030. Furthermore, for example, the estimated charging time of vehicle B may be 40 minutes, the estimated arrival time of vehicle B may be 12:40, and the estimated charging end time of vehicle B may be 13:20.

Furthermore, for example, vehicle O may be currently traveling to the second charging station 1030. Furthermore, for example, the estimated charging time of vehicle O may be 50 minutes, the estimated arrival time of vehicle O may be 13:20, and the estimated charging end time of vehicle O may be 14:10. Furthermore, for example, the estimated arrival time when vehicle P 1010 arrives at the second charging station 1030 may be 50 minutes.

Furthermore, for example, the average daily time taken for charging in the third charging station 1040 may be 30 minutes, and vehicle C may be currently traveling to the third charging station 1040. Furthermore, for example, the estimated charging time of vehicle C may be 40 minutes, the estimated arrival time of vehicle C may be 13:20, and the estimated charging end time of vehicle C may be 14:00. Furthermore, for example, the estimated arrival time when vehicle P 1010 arrives at the third charging station 1040 may be 90 minutes.

In the above-mentioned embodiment, the charging station recommendation device may recommend the third charging station 1040, in which vehicle P 1010 is configured to start to be charged without waiting, among the first charging station 1020, the second charging station 1030, and the third charging station 1040 to vehicle P 1010.

Figure 11:
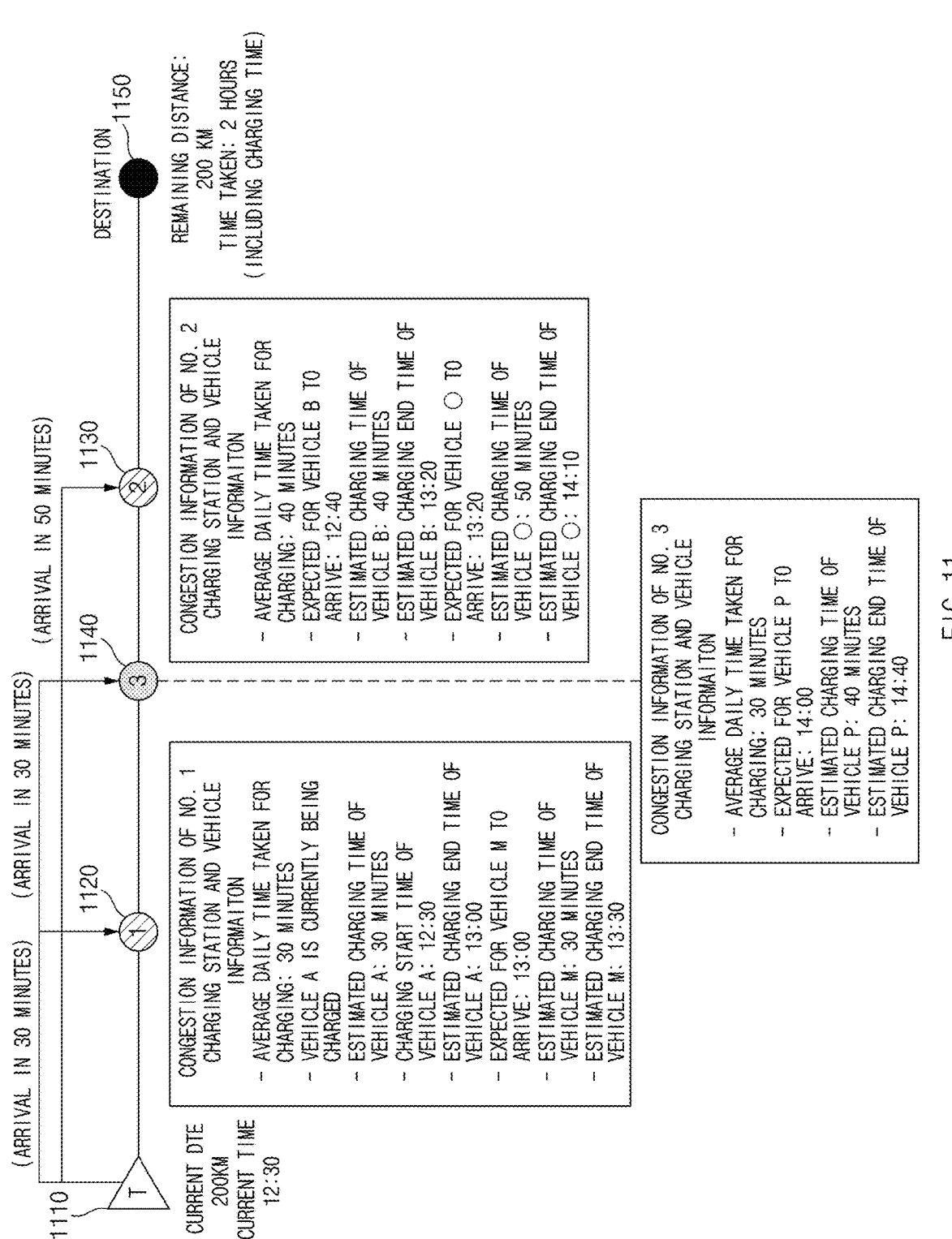
FIG. 11 illustrating recommending a charging station using information related to an average daily time taken for charging for each charging station in a charging station recommendation device and a method therefor according to an exemplary embodiment of the present disclosure.

FIG. 11 illustrating recommending a charging station using information related to an average daily time taken for charging for each charging station in a charging station recommendation device and a method therefor according to an exemplary embodiment of the present disclosure.

Referring to FIG. 11, in the charging station recommendation device and the method therefor according to an exemplary embodiment of the present disclosure, when it is determined that it is impossible for a host vehicle (e.g., vehicle T) 1110 to arrive at a destination 1150, in response that the destination 1150 of the host vehicle (e.g., vehicle T) 1110 is set, the charging station recommendation device may recommend an optimal charging station to vehicle T 1110 using congestion information for each charging station and vehicle information.

According to an exemplary embodiment of the present disclosure, when it is determined that it is impossible for vehicle T 1110 to arrive at the destination 1150, in response that the destination 1150 of vehicle P 1110 is set, the charging station recommendation device may recommend an optimal charging station to vehicle T 1110 with respect to data of vehicle T 1110 and a current time. For example, the data of vehicle T 1110 may include a DTE.

According to an exemplary embodiment of the present disclosure, when the DTE of vehicle T 1110 is less than, or less than or equal to, a remaining distance to the destination 1150, the charging station recommendation device may determine that it is impossible for vehicle T 1110 to arrive at the destination 1150.

For example, the remaining distance to the set destination 1150 may be 200 km, and a time taken for arrival may be two hours. Furthermore, for example, a DTE of vehicle T 1110 may be 200 km, and a destination search request time may be 12:30. In the instant case, the charging station recommendation device may determine that it is impossible for vehicle T 1110 to arrive at the destination 1150.

According to an exemplary embodiment of the present disclosure, the charging station recommendation device may recommend an optimal charging station to vehicle T 1110 based on congestion information of the charging station and vehicle information.

According to an exemplary embodiment of the present disclosure, congestion information and vehicle information of each of the first charging station 1120, the second charging station 1130, and the third charging station 1140 may include at least one of an average daily time taken for charging, an estimated charging time, a charging start time, or a charging end time.

For example, the average daily time taken for charging in the first charging station 1120 may be 30 minutes, and vehicle A may be currently being charged in the first charging station 1120. Furthermore, for example, the estimated charging time of vehicle A may be 30 minutes, the charging start time of vehicle A may be 12:30, and the estimated charging end time of vehicle A may be 13:00.

Furthermore, for example, vehicle M may be currently traveling to the first charging station 1120. Furthermore, for example, the estimated charging time of vehicle M may be 30 minutes, the estimated arrival time of vehicle M may be 13:00, and the estimated charging end time of vehicle M may be 13:30. Furthermore, for example, the estimated arrival time when vehicle T 1110 arrives at the first charging station 1120 may be 30 minutes.

Furthermore, for example, the average daily time taken for charging in the second charging station 1130 may be 40 minutes, and vehicle B may be currently traveling to the second charging station 1130. Furthermore, for example, the estimated charging time of vehicle B may be 40 minutes, the estimated arrival time of vehicle B may be 12:40, and the estimated charging end time of vehicle B may be 13:20.

Furthermore, for example, vehicle O may be currently traveling to the second charging station 1130. Furthermore, for example, the estimated charging time of vehicle O may be 50 minutes, the estimated arrival time of vehicle O may be 13:20, and the estimated charging end time of vehicle O may be 14:10. Furthermore, for example, the estimated arrival time when vehicle T 1110 arrives at the second charging station 1130 may be 50 minutes.

Furthermore, for example, the average daily time taken for charging in the third charging station 1140 may be 30 minutes, and vehicle P may be currently traveling to the third charging station 1140. Furthermore, for example, the estimated charging time of vehicle P may be 40 minutes, the estimated arrival time of vehicle P may be 14:00, and the estimated charging end time of vehicle P may be 14:20. Furthermore, for example, the estimated arrival time when vehicle T 1110 arrives at the third charging station 1140 may be 30 minutes.

According to an exemplary embodiment of the present disclosure, when there is no another vehicle which is being charged in the charging station or when there is no another vehicle which arrives at the charging station before the host vehicle arrives at the charging station, with respect to the destination search request time, the charging station recommendation device may determine an optimal charging station based on information related to the average daily time taken for charging for each charging station.

For example, because there is no vehicle which is being charged in the third charging station 1140 and when there is no another vehicle which arrives at the third charging station 1140 before vehicle T 1110 arrives at the third charging station 1140, the charging station recommendation device may determine an optimal charging station based on information related to the average daily time taken for charging in the third charging station 1140.

In the above-mentioned embodiment, the charging station recommendation device may recommend the third charging station 1140, in which vehicle T 1110 is configured to start to be charged without waiting, among the first charging station 1120, the second charging station 1130, and the third charging station 1140 to vehicle T 1110.

Figure 12:
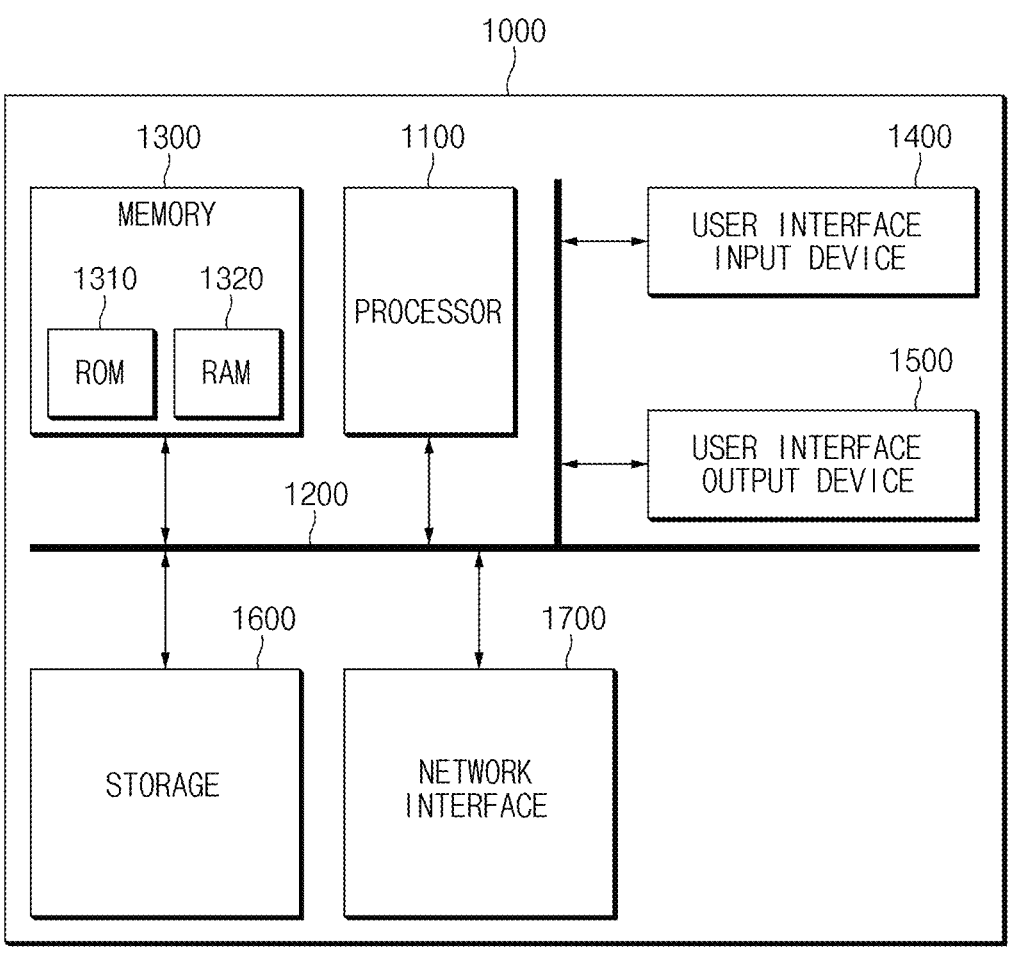
FIG. 12 illustrates a computing system about a charging station recommendation device and a method therefor according to an exemplary embodiment of the present disclosure.

FIG. 12 illustrates a computing system about a charging station recommendation device and a method therefor according to an exemplary embodiment of the present disclosure.

Referring to FIG. 12, a computing system 1000 about the charging station recommendation device and the method therefor may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Accordingly, the operations of the method or algorithm described in connection with the exemplary embodiments included in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be provided of effects of the charging station recommendation device and the method therefor according to an exemplary embodiment of the present disclosure.

According to at least one of embodiments of the present disclosure, the charging station recommendation device and the method therefor may be provided to control a congestion of a vehicle for each charging station by generating congestion information for each charging station.

Furthermore, according to at least one of embodiments of the present disclosure, the charging station recommendation device and the method therefor may be provided to control a congestion of a vehicle for each charging station by generating charging information of the vehicle for each charging station.

Furthermore, according to at least one of embodiments of the present disclosure, the charging station recommendation device and the method therefor may be provided to generate estimated arrival information of a vehicle for each charging station and control a congestion of the vehicle for each charging station.

Furthermore, according to at least one of embodiments of the present disclosure, the charging station recommendation device and the method therefor may be provided to guide a vehicle which needs charging to the most optimal charging station using prediction information when guiding an electric vehicle along a route via a charging station.

Furthermore, according to at least one of embodiments of the present disclosure, the charging station recommendation device and the method therefor may be provided to select whether to guide a next vehicle to any charging station with respect to guide information and may control a congestion of a vehicle for each charging station.

Furthermore, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A charging station recommendation apparatus, comprising:

a data collection device configured to collect real-time information of at least one charging station and real-time information of at least one vehicle associated with the at least one charging station;

a data processing device configured to generate charging information including a congestion of the at least one charging station, based on the collected real-time information of the at least one charging station and the collected real-time information of the at least one vehicle;

a data storage configured for storing the generated charging information of the at least one charging station; and a data application device configured to recommend an optimal charging station among the at least one charging station to a host vehicle, based on the generated charging information of the at least one charging station, the generated charging information being stored in the data storage, wherein the data application device is configured to allocate a predetermined value to each of the at least one charging station selected for each predetermined time period among a plurality of charging stations, based on at least one of a charging station preference of a driver, a charger type preference of the driver, a distance to a final destination, or a distance to a stop, and to recommend the optimal charging station, in accordance with the allocated predetermined value and real-time information of at least one vehicle associated with the at least one charging station, and wherein the congestion information and the vehicle information include at least one of an average daily time taken for charging, an estimated charging time, a charging start time, or a charging end time, and wherein the data application device is further configured to calculate a weight for each of the charging stations in real time, by considering an estimated available charging time of the at least one charging station, an estimated arrival time of the host vehicle, a required charging time, a congestion level of the charging station, a driver's preference, and a state of the host vehicle, based on the real-time information of the at least one vehicle and the real-time information of the at least one charging station, and to recommend the optimal charging station to the host vehicle in real time based on the calculated weight.

2. The charging station recommendation apparatus of claim 1, wherein the data application device is configured to determine a difference between an estimated charging end time of the at least one vehicle and an estimated arrival time when the host vehicle arrives at the optimal charging station, when the at least one vehicle is a vehicle which is being charged in the optimal charging station, and the optimal charging station is recommended when the difference is less than a predetermined time period.

3. The charging station recommendation apparatus of claim 1, wherein the data application device is configured to determine a difference between an estimated charging end time of the at least one vehicle, the estimated charging end time including an estimated arrival time when the at least one vehicle arrives at the optimal charging station, when the at least one vehicle is a vehicle which is traveling to the optimal charging station, and the optimal charging station is recommended when the difference is less than a predetermined time period.

4. The charging station recommendation apparatus of claim 1, wherein the data processing device is configured to generate a database for the congestion, based on an average time taken for charging in the at least one charging station.

5. The charging station recommendation apparatus of claim 4, wherein the data processing device is configured to update the database for each predetermined time period, based on the collected real-time information of the at least one charging station and the collected real-time information of the at least one vehicle, and wherein the data storage is configured to store the generated charging information including the updated database.

6. The charging station recommendation apparatus of claim 1, wherein the data application device is configured to recommend the optimal charging station, when it is determined that it is impossible for the host vehicle to arrive at at least one of a destination of the host vehicle or a stop of the host vehicle, based on a state of charge, a distance to empty, a location of the host vehicle, or a distance to the destination or the stop, after the at least one of the destination or the stop is set, and wherein the data of the host vehicle includes at least one of position information of the host vehicle, a current state of charge (SOC) value of the host vehicle, or a distance to empty (DTE) of the host vehicle.

7. The charging station recommendation apparatus of claim 1, wherein the at least one charging station includes a charging station selected for each predetermined time period among the plurality of charging stations, the charging station in which an estimated arrival time when the host vehicle arrives at each of the charging stations is less than, or less than or equal to, a threshold time.

8. The charging station recommendation apparatus of claim 1, wherein the collected real-time information of the at least one charging station includes at least one of state information of a charger in the at least one charging station, a type of the charger, position information of the at least one charging station, or information related to convenient facilities around the at least one charging station.

9. The charging station recommendation apparatus of claim 8, wherein the state information of the charger includes at least one of whether the charger is charged, whether it is possible to use the charger, or whether the charger fails, and wherein the type of the charger includes at least one of an ultrafast type, a fast type, or a slow type.

10. A charging station recommendation method, comprising:

collecting, by a data collection device, real-time information of at least one charging station and real-time information of at least one vehicle associated with the at least one charging station;

generating, by a data processing device, charging information including a congestion of the at least one charging station, based on the collected real-time information of the at least one charging station and the collected real-time information of the at least one vehicle;

storing, by a data storage, the generated charging information of the at least one charging station; and recommending, by a data application device, an optimal charging station among the at least one charging station to a host vehicle, based on the generated charging information of the at least one charging station, the generated charging information being stored in the data storage, wherein the recommending of the optimal charging station among the at least one charging station to the host vehicle includes:

allocating, by the data application device, a predetermined value to each of the at least one charging station selected for each predetermined time period among a plurality of charging stations, based on at least one of a charging station preference of a driver, a charger type preference of the driver, a distance to a final destination, or a distance to a stop, and real-time information of at least one vehicle associated with the at least one charging station, wherein the congestion information and the vehicle information include at least one of an average daily time taken for charging, an estimated charging time, a charging start time, or a charging end time, calculating, by the data application device, a weight for each of the charging stations in real time, by considering an estimated available charging time of the at least one charging station, an estimated arrival time of the host vehicle, a required charging time, a congestion level of the charging station, a driver's preference, and a state of the host vehicle, based on the real-time information of the at least one vehicle and the real-time information of the at least one charging station; and recommending, by the data application device, the optimal charging station, to the host vehicle in real time based on the calculated weight.

11. The charging station recommendation method of claim 10, wherein the recommending of the optimal charging station among the at least one charging station to the host vehicle includes:

determining, by the data application device, a difference between an estimated charging end time of the at least one vehicle and an estimated arrival time when the host vehicle arrives at the optimal charging station; and recommending, by the data application device, the optimal charging station when the difference is less than a predetermined time period, when the at least one vehicle is a vehicle which is being charged in the optimal charging station.

12. The charging station recommendation method of claim 10, wherein the recommending of the optimal charging station among the at least one charging station to the host vehicle includes:

determining, by the data application device, a difference between an estimated charging end time of the at least one vehicle, the estimated charging end time including an estimated arrival time when the at least one vehicle arrives at the optimal charging station, and an estimated arrival time when the host vehicle arrives at the optimal charging station; and recommending, by the data application device, the optimal charging station when the difference is less than the predetermined time period, when the at least one vehicle is a vehicle which is traveling to the optimal charging station.

13. The charging station recommendation method of claim 10, wherein the generating of the charging information including the congestion of the at least one charging station includes:

generating, by the data processing device, a database for the congestion, based on an average time taken for charging in the at least one charging station.

14. The charging station recommendation method of claim 13, wherein the generating of the charging information including the congestion of the at least one charging station includes:

updating, by the data processing device, the database for each predetermined time period, based on the collected real-time information of the at least one charging station and the collected real-time information of the at least one vehicle, and wherein the storing of the generated charging information of the at least one charging station includes:

storing, by the data storage, the generated charging information including the updated database.

15. The charging station recommendation method of claim 10, wherein the recommending of the optimal charging station among the at least one charging station to the host vehicle includes:

recommending, by the data application device, the optimal charging station, when it is determined that it is impossible for the host vehicle to arrive at at least one of a destination of the host vehicle or a stop of the host vehicle, based on data of the host vehicle or the at least one of the destination or the stop, after the at least one of the destination or the stop is set, and wherein the data of the host vehicle includes at least one of position information of the host vehicle, a current state of charge (SOC) value of the host vehicle, or a distance to empty (DTE) of the host vehicle.

16. The charging station recommendation method of claim 10, wherein the at least one charging station includes a charging station selected for each predetermined time period among the plurality of charging stations, the charging station in which an estimated arrival time when the host vehicle arrives at each of the charging stations is less than, or less than or equal to, a threshold time.

17. The charging station recommendation method of claim 10, wherein the collected real-time information of the at least one charging station includes at least one of state information of a charger in the at least one charging station, a type of the charger, position information of the at least one charging station, or information related to convenient facilities around the at least one charging station.

18. The charging station recommendation method of claim 17, wherein the state information of the charger includes at least one of whether the charger is charged, whether it is possible to use the charger, or whether the charger fails, and wherein the type of the charger includes at least one of an ultrafast type, a fast type, or a slow type.

* * * * *